(12) United States Patent
Sakamoto

(10) Patent No.: US 7,812,996 B2
(45) Date of Patent: Oct. 12, 2010

(54) INFORMATION PROCESSING APPARATUS AND METHOD FOR DELETING BLANK PAGES WHILE MAINTAINING PAGE ORDER

(75) Inventor: Yoichi Sakamoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1121 days.

(21) Appl. No.: 11/169,623

(22) Filed: Jun. 30, 2005

(65) Prior Publication Data

US 2006/0001896 A1     Jan. 5, 2006

(30) Foreign Application Priority Data

Jul. 5, 2004    (JP)   ............... 2004-198142

(51) Int. Cl.
*G06K 15/00* (2006.01)
(52) U.S. Cl. ............... 358/1.18; 358/1.1; 358/1.12; 358/1.13; 358/1.14; 358/1.6; 358/3.07; 358/400; 358/498; 399/18; 399/382; 399/82; 400/582; 400/605; 400/76; 710/8
(58) Field of Classification Search .............. 358/1.18
See application file for complete search history.

(56) References Cited

U.S. PATENT DOCUMENTS

| | | | | |
|---|---|---|---|---|
| 4,839,740 A * | 6/1989 | Yoshida | ................ | 358/498 |
| 5,680,522 A * | 10/1997 | Kasai | ................ | 358/1.14 |
| 6,069,704 A * | 5/2000 | Verhaag | ................ | 358/1.12 |
| 6,233,057 B1 * | 5/2001 | Ota | ................ | 358/1.13 |
| 2002/0122189 A1 * | 9/2002 | Salgado | ................ | 358/1.6 |
| 2003/0038988 A1 * | 2/2003 | Anderson et al. | ............ | 358/474 |
| 2003/0113130 A1 * | 6/2003 | Robertson et al. | ............. | 399/82 |
| 2003/0235451 A1 * | 12/2003 | Brown et al. | ................. | 400/76 |
| 2005/0094228 A1 * | 5/2005 | Sevier | ............. | 358/498 |
| 2005/0160194 A1 * | 7/2005 | Bango et al. | ............... | 710/8 |
| 2005/0185225 A1 * | 8/2005 | Brawn et al. | ............... | 358/401 |
| 2005/0270552 A1 | 12/2005 | Sakamoto | ............. | 358/1.13 |

FOREIGN PATENT DOCUMENTS

| | | | |
|---|---|---|---|
| JP | 59-159368 | | 9/1984 |
| JP | 5-19472 | | 1/1993 |
| JP | 05048806 A | * | 2/1993 |
| JP | 6-22091 | | 1/1994 |
| JP | 7-117285 | | 5/1995 |
| JP | 10-161828 | | 6/1998 |
| JP | 2001-205866 | | 7/2001 |

OTHER PUBLICATIONS

Office Action, dated Aug. 18, 2008, in JP 2004-198142.
JPOA, dated Jan. 16, 2009, in JP 2004-198142.

* cited by examiner

*Primary Examiner*—King Y Poon
*Assistant Examiner*—David S Cammack
(74) *Attorney, Agent, or Firm*—Fitzpatrick, Cella, Harper & Scinto

(57) ABSTRACT

The present invention makes it possible to obtain output results consistent with a user's intentions without the front and back sides of the pages getting out of order by not performing output only when both the front and back are blank when performing a blank page save. As a result, print data is input and a sheet management table for each page is produced. Then, when a sheet management table is generated in which print data for both the front and the back of a single printing sheet does not exist, that sheet management table is deleted.

12 Claims, 19 Drawing Sheets

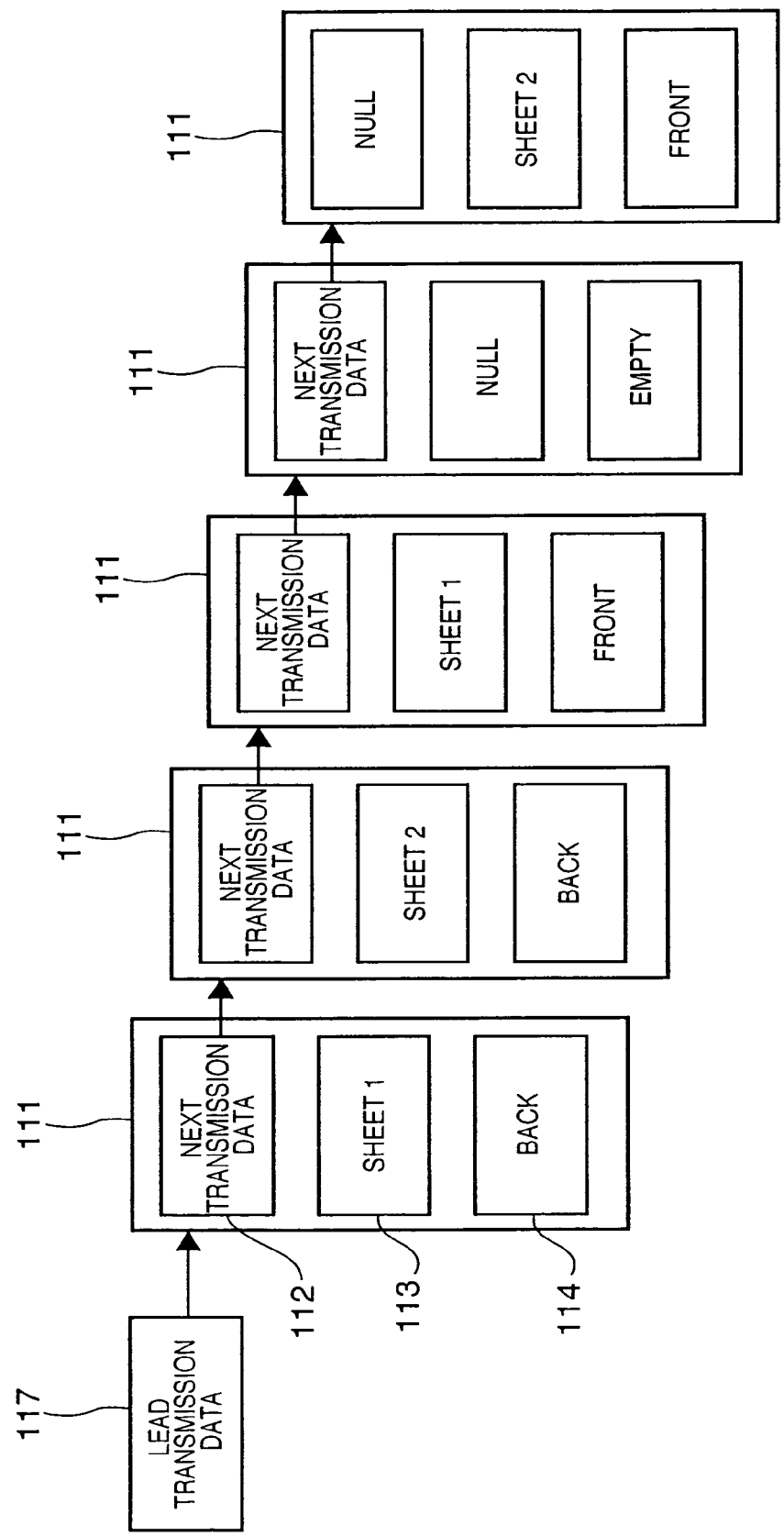

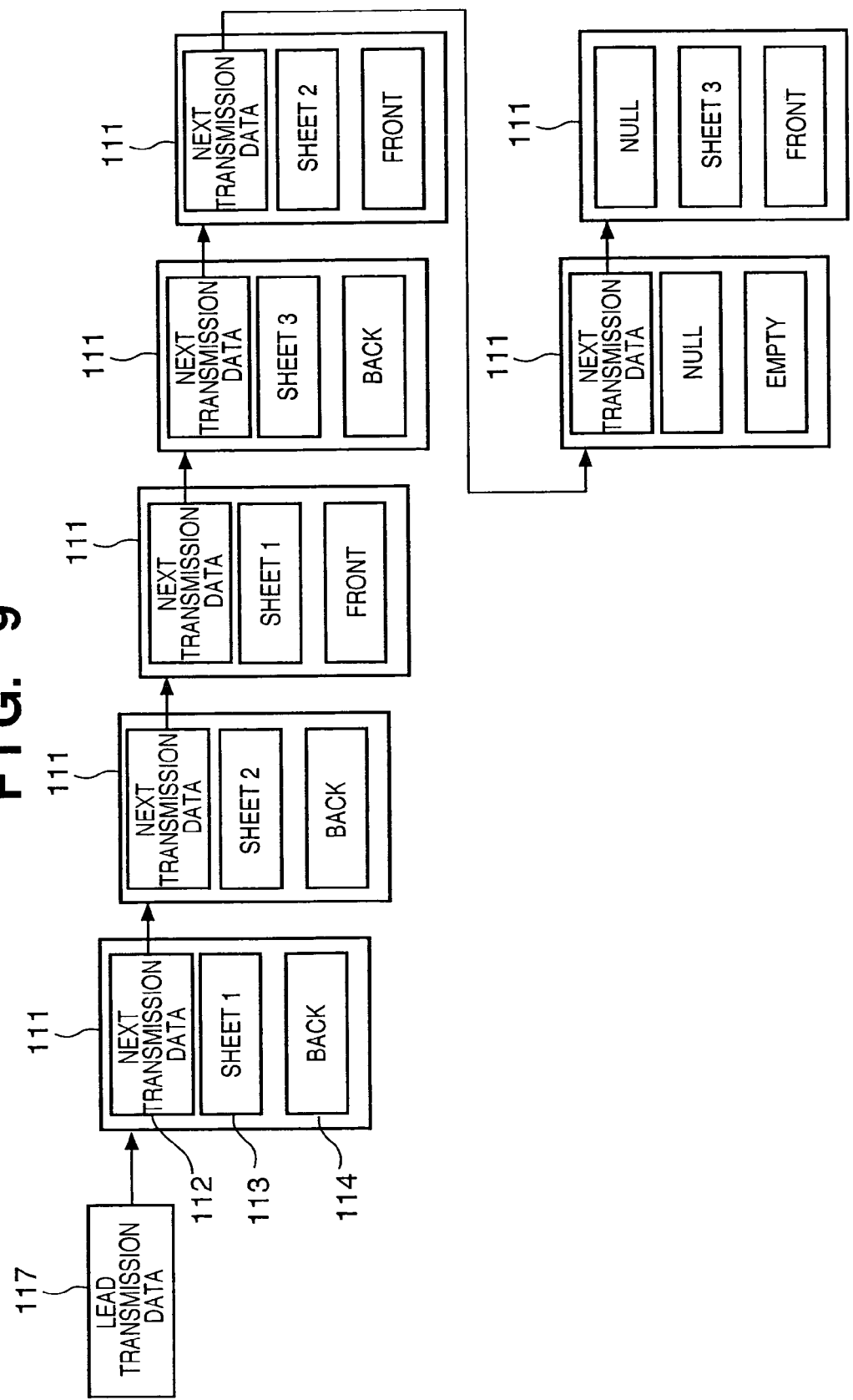

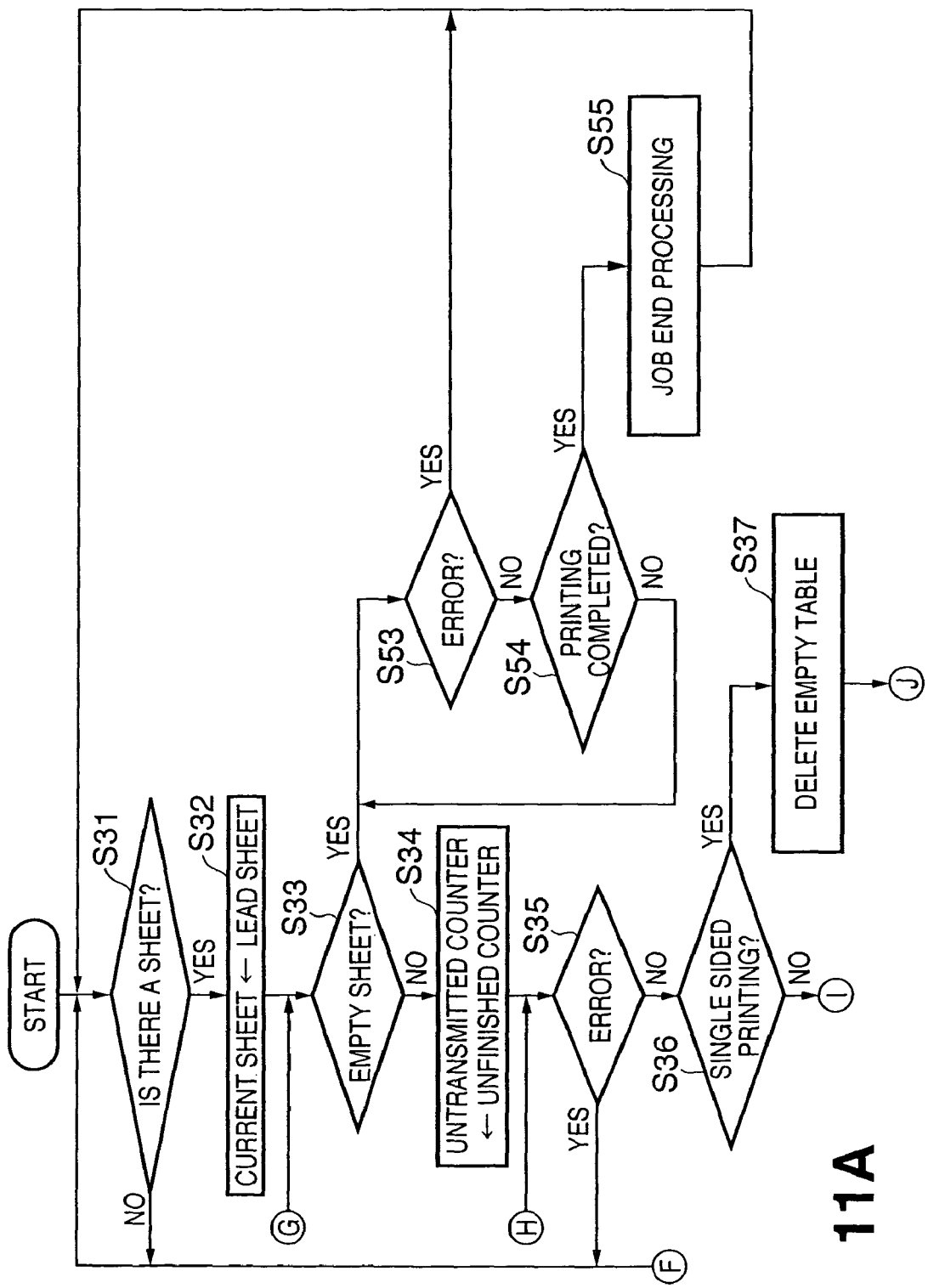
F I G. 11A

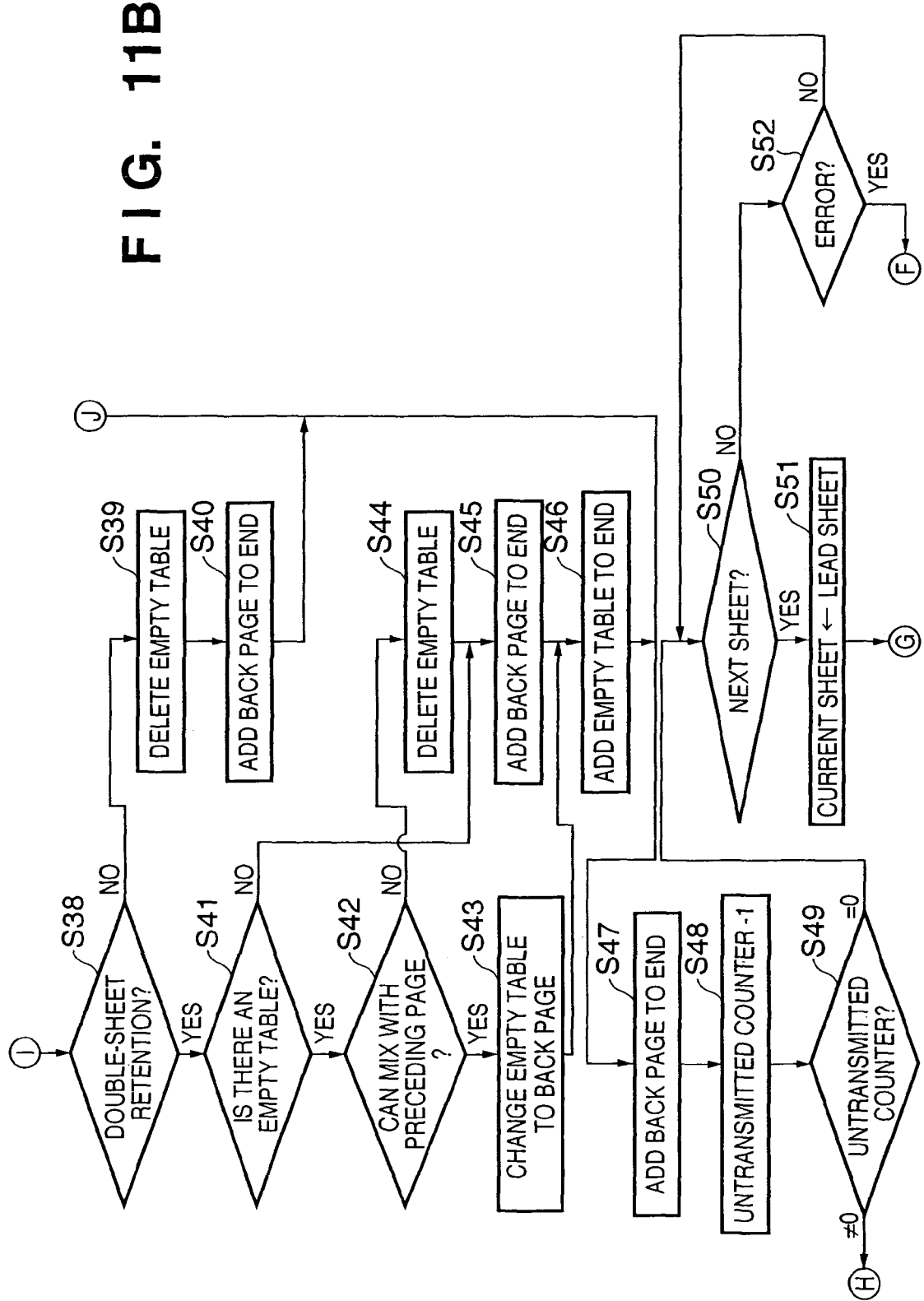

F I G. 13
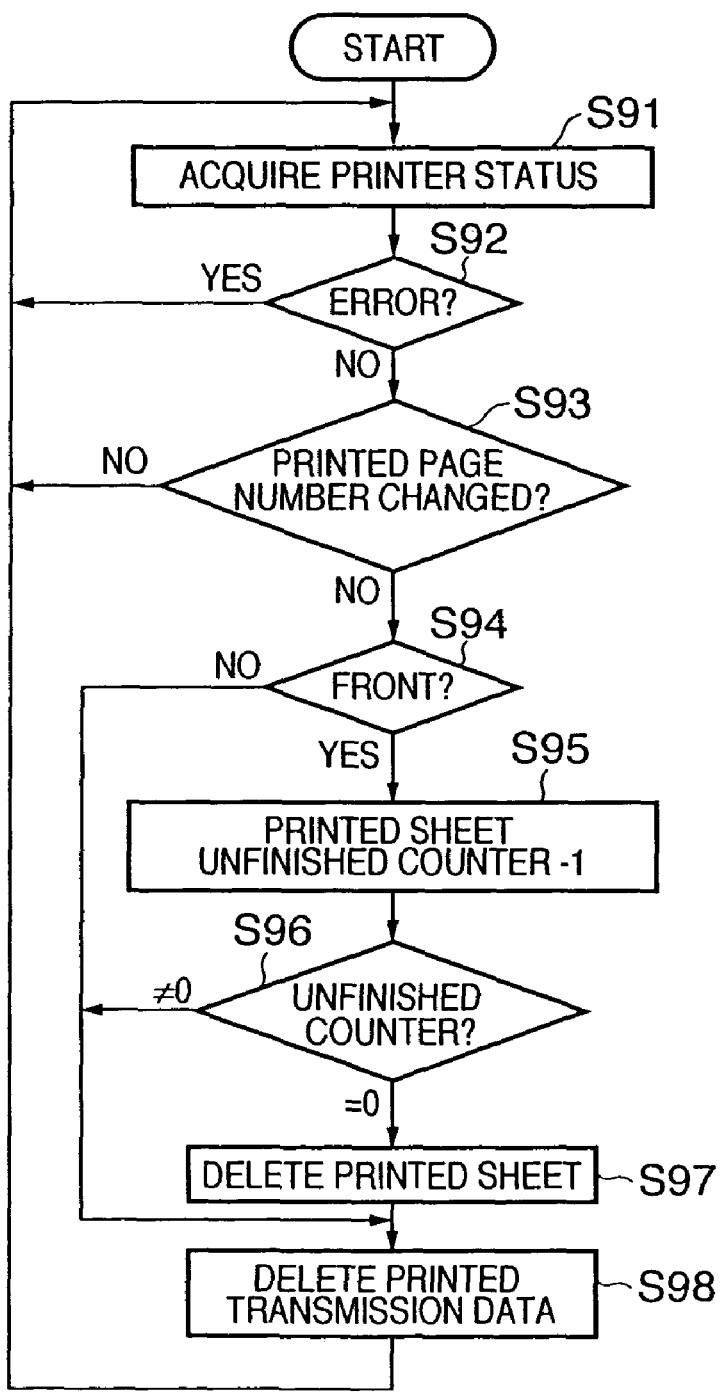

F I G. 14

| TRANSMISSION ORDER | PAGE |
|---|---|
| 1 | SHEET 1 BACK |
| 2 | (UNUSABLE) |
| 3 | SHEET 2 BACK |
| 4 | SHEET 1 FRONT |
| 5 | SHEET 3 BACK |
| 6 | SHEET 2 FRONT |
| 7 | (EMPTY) |
| 8 | SHEET 3 FRONT |

INFORMATION PROCESSING APPARATUS AND METHOD FOR DELETING BLANK PAGES WHILE MAINTAINING PAGE ORDER

FIELD OF THE INVENTION

The present invention concerns a technology for printing on both sides of a printing medium such as printing paper.

BACKGROUND OF THE INVENTION

Conventionally, in a printer, in order to eliminate the waste of outputting a blank in the case of a page on which image to be printed does not exist, a so-called blank page save function is known that does not output a page where an image to be printed does not exist (for example, Japanese Patent Publication No. 5-19472).

According to the foregoing method, because blank page determination is carried out in page units, during double sided printing output is not carried out when there is a page that is blank and thus the pages get out of order. As a result, the even-numbered pages, which should be printed on the back, are printed on the front, and the odd-numbered pages, which should be printed on the front, are printed on the back, leading to a result not intended by the user. For example, as shown in FIG. 15A, when one wishes to double truck the fourth page and the fifth page, and the second page (or the third page) is not output because it is blank, then, as shown in FIG. 15B, the pages get out of order, and consequently the fifth page and the sixth page are double trucked.

SUMMARY OF THE INVENTION

The present invention is conceived in view of the aforementioned problem, and provides a technology that maintains the order of double trucked pages and the like set by the user by determining whether or not each printing medium unit, not each page unit, is blank, and further, eliminates unnecessary blank page output.

To attain the foregoing object, an information processing apparatus of the present invention is comprised, for example, of the following configuration, that is, an information processing apparatus that is communicably connected to a double sided printing-capable printer and that outputs print data for double sided printing to such printer, comprising:

print data generating means for generating print data for each page, based on data of a print object transmitted from host processing;

management data production means for producing transmission management data for managing the order in which the print data generated is output to the printer;

determining means for determining whether or not both front and back sides of a single printing medium is blank, based on the management data produced; and output control means for deleting such print data from the transmitted management data when the determining means determines that both sides are blank, and outputting print data to the printer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing a transmission data management table for up to four pages in double sided printing of double-sheet retention alternating paper supply;

FIG. 9 is a diagram showing a transmission data management table for up to six pages in double sided printing of double-sheet retention alternating paper supply;

FIGS. 11A and 11B are flow charts illustrating processes carried out by the language monitor in double sided printing in the present embodiment;

FIG. 13 is a flow chart illustrating a status monitoring process carried out by the language monitor in the present embodiment;

FIG. 14 is a diagram showing a table showing the order of transmission pages in double sided printing of double-sheet retention alternating paper supply;

DETAILED DESCRIPTION OF THE PREFERRED EMBODIMENTS

Preferred embodiments of the present invention will now be described in detail according to the accompanying drawings.

First Embodiment

Figure 1:
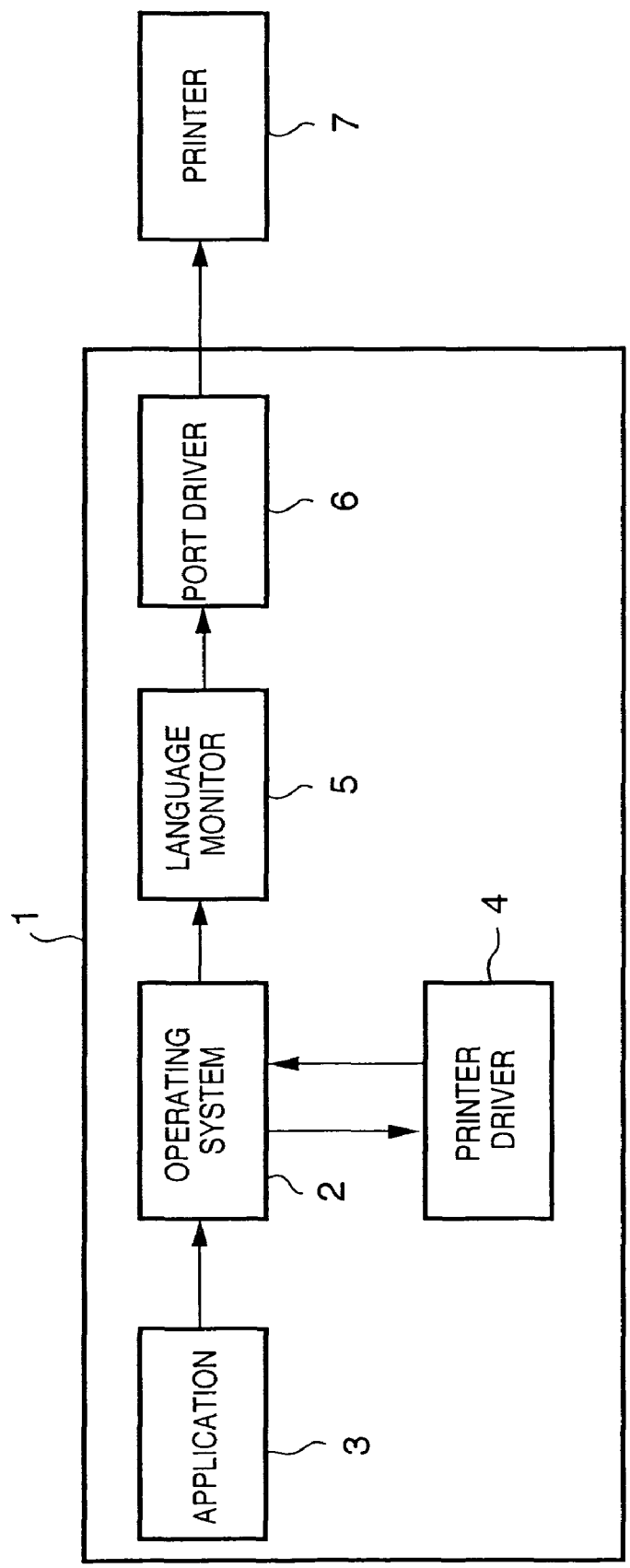
FIG. 1 is a block diagram of a system in an embodiment of the present invention.

FIG. 1 is a block diagram of the configuration of the apparatus of the invention. In the diagram, reference numeral 1 denotes an ordinary computer such as a personal computer (hereinafter "PC"), comprising hardware, not shown, such as a CPU, a memory, a hard disk, a floppy (registered trademark) disk drive, a keyboard, a mouse pointing device, a monitor and a network interface. Reference numeral 2 denotes an operating system (OS), which manages the hardware with which the PC 1 is equipped and software such as an application 3, a printer driver 4, a language monitor 5 and a port driver 6. The application 3 is application software like a word processor, for example, which creates and prints documents in accordance with instructions from an operator. Reference numeral 4 denotes the printer driver, which accepts print instructions issued by the application 3 through the operating system 2 and converts these print instructions into printer commands that can be interpreted by the language monitor 5 and the printer 7. Reference numeral 5 denotes the language monitor, which accepts the printer commands that the printer driver 4 outputs and transmits them to the printer 7 through the port driver 6. Reference numeral 6 denotes the port driver, which transmits the printer commands output by the language monitor 5 to the printer 5 through, for example, a USB interface, as also outputs to the language monitor if it receives a status report from the printer 7. Reference numeral 7 denotes a printer, which prints according to printer commands received from the port driver 6. The printer 7 is provided with a built-in feed path that inverts the printing paper, and therefore can of course print on one side as well as on both sides of the printing paper.

Figure 2:
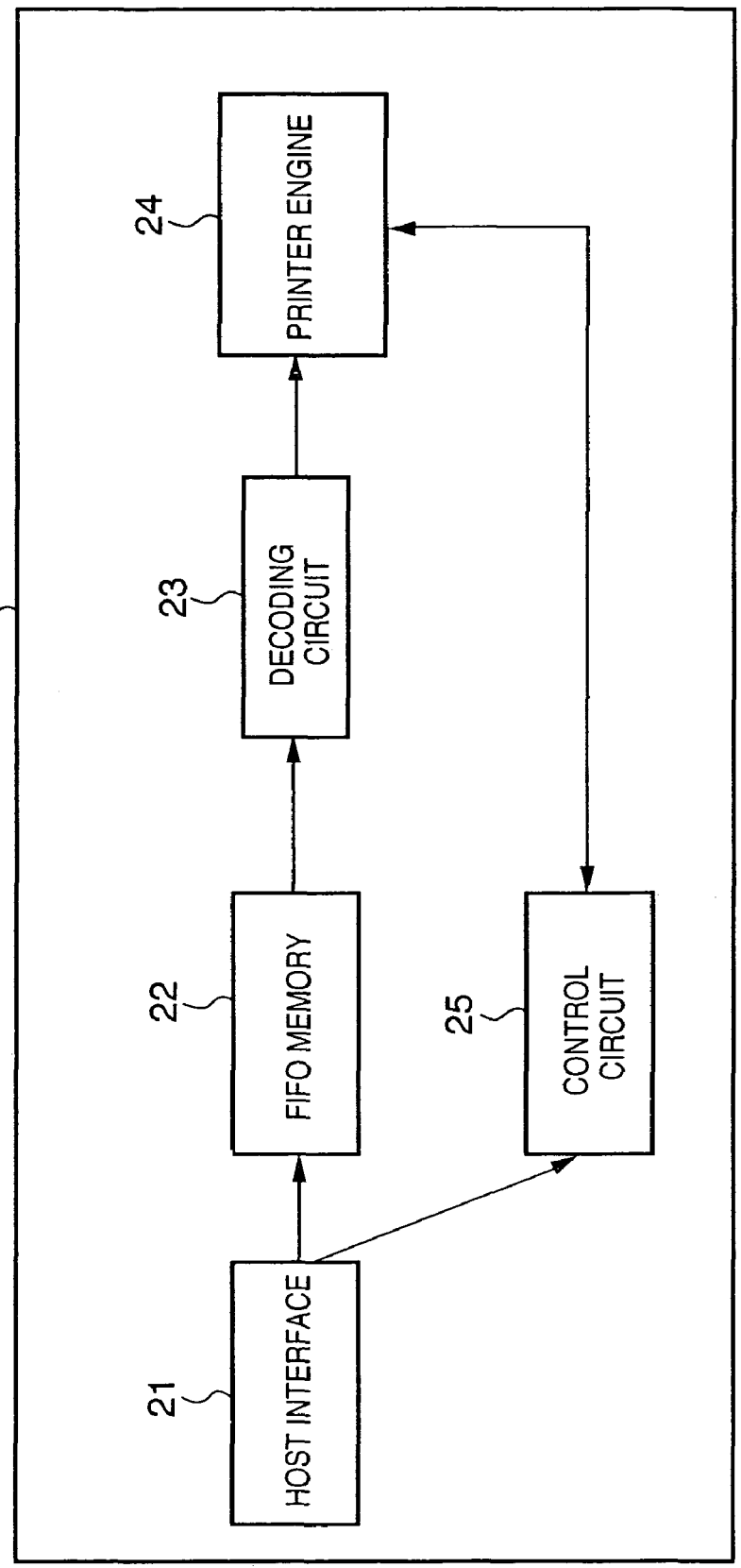
FIG. 2 is a diagram of the printer in the present embodiment.

FIG. 2 is a block diagram of the configuration of the printer 7. In the diagram, reference numeral 21 denotes a host interface like a USB interface, for example, and receives printer commands from the PC 1. Reference numeral 22 denotes a FIFO (first-in-first-out) memory, which contains image data received from the host interface 21. A decoding circuit 23 decodes image data stored in the FIFO memory 22 and outputs it to a printer engine 24. The printer engine 24 is a laser beam printer engine, which carries out printing according to the image data that the decoding circuit 23 outputs. Reference numeral 25 denotes a control circuit, which is constructed of a single chip CPU, for example, and controls the network interface 21, the FIFO memory 22, the decoding circuit 23 and the printer engine 24.

A description is now given of the printing process carried out by the PC 1 in the present embodiment.

Figure 16:
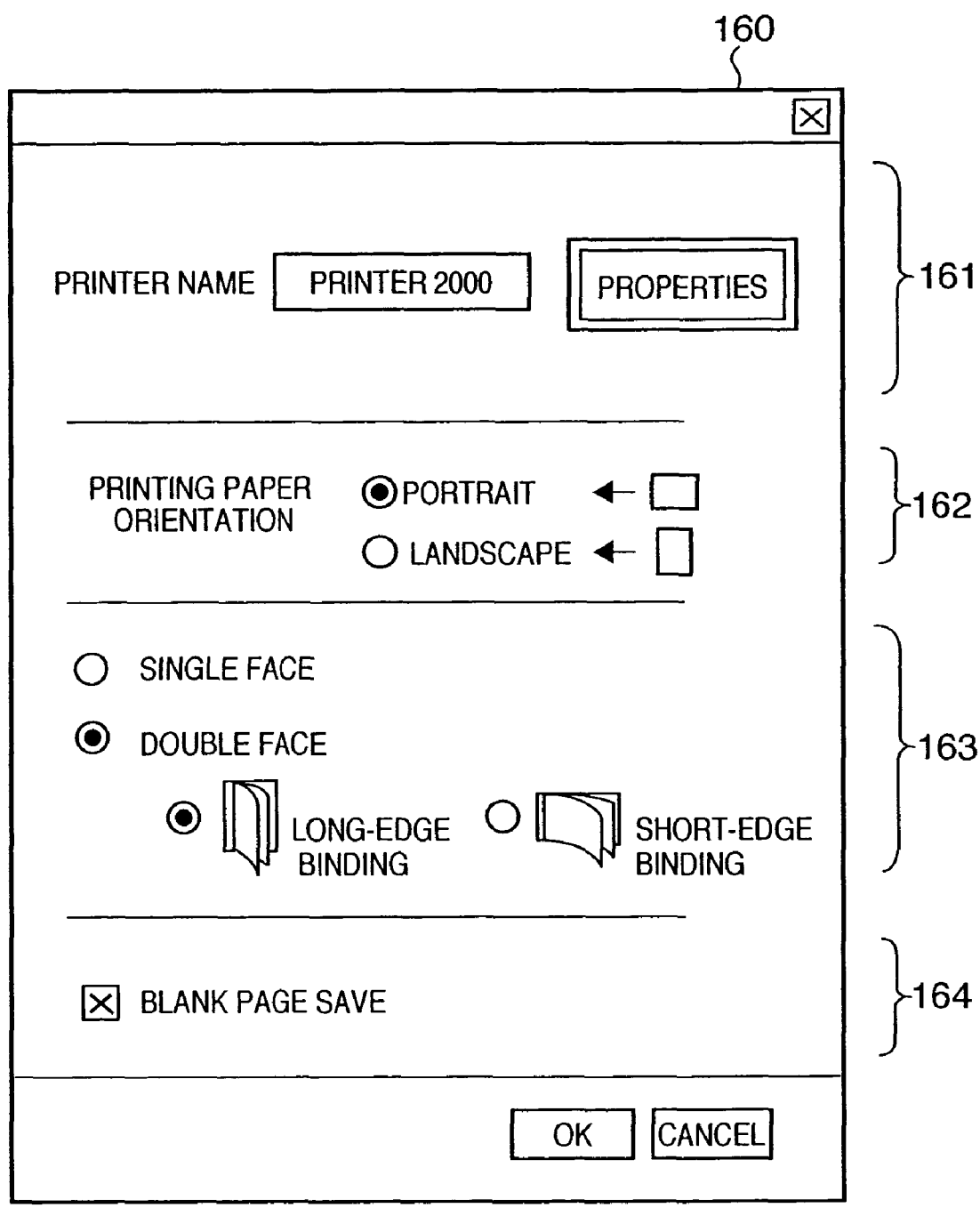
FIG. 16 is a diagram showing a sample setup window displayed when printing in the present embodiment.

When the operator operates the application 3 on the PC 1 side and orders a printing, a print instruction window, not shown, is displayed. When specific setting buttons in the window, not shown, are pressed, the setting window 160 shown in FIG. 16 is displayed. The displayed setting window 160 is one part of the processing carried out by the printer driver 4.

As shown in the diagram, the setting window 160 includes an area 161, displaying the name of the printer that is to print (when the "Properties" button is clicked, more detailed information and setting windows are displayed), an area 162, specifying the orientation of the printing paper, an area 163, selecting either single-sided printing or double-sided printing, and an area 164 specifying whether or not to perform blank page save.

The choice of single-sided/double-sided in area 163 is in the form of radio buttons (in the default setting, the single-sided button is selected). In addition, when double-sided is selected, one elects to bind the printing paper along either the long edge or the short edge. This selection also is in the form of radio buttons (with long-edge binding selected as the default).

Whether or not to perform the blank page save in area 164 is specified in the form of a checkbox (in the default setting, the checkbox is checked).

When blank page save is carried out, and further, when double sided printing is selected, the blank page save mode during double-sided printing described in this embodiment function.

Finally, when the OK button is clicked, the selection is entered, the window 160 disappears from the screen and there is a return to the window at which a print start order is carried out. It should be noted that, if the "Cancel" button is clicked, the setting contents are discarded and the settings prior to the display of the window 160 are entered.

Then, at the window at which the print start order is carried out, both the printer driver 4 and the language monitor 5 of the embodiment are activated and the process terminates when a series of print jobs is completed. A more detailed description in the context of the present embodiment is given below.

When a print start is ordered, print instructions are transmitted from the application 3 to the printer driver 4 through the operating system 2. Based on the print instructions issued from the application 3, the printer driver 4 converts the instructions into an image data, compresses the image data and outputs that compressed image data together with a job information command that specifies whether there is double sided printing, whether there is a blank page save specified, the number of copies specified and so forth, a page information command that specifies the paper size, the paper type, the paper supply source, the paper ejection destination, the length of the lines and the number of lines in the image data and so forth, a page end command that indicates the end of a page as well as whether or not the page is blank, and a job end command that indicates the end of a job. It should be noted that, with so-called side-delivery sheets, in which the paper is supplied from the long edge, it is necessary to rotate the image 270 degrees, In addition, in double sided printing, there are two types of binding, long-edge binding and short-edge binding, depending on whether the bound side is the long edge or the short edge. In the case of so-called vertical feed, in which the paper is supplied from the short edge for long-edge binding, and in the case of so-called horizontal feed, in which the paper is supplied from the long edge for short-edge binding, it is necessary to rotate the back page image a further 180 degrees, and therefore the printer driver 4 in advance rotates the image as necessary depending on the direction of binding and the direction of paper supply.

In addition, in the present embodiment, the face down tray is always specified as the paper ejection destination. In addition, the printer driver 4, when it outputs the job information command, specifies blank page save based on user instruction. In addition, the printer driver 4, when it outputs the page end command, determines whether or not the page is blank, and if so, sets information, indicating that that page is blank, into an output command.

When the printer command is output from the printer driver 4, the operating system 2 sequentially transfers to the language monitor 5 the printer commands. The language monitor 5 then sequentially transmits the accepted printer commands to the printer 7. It should be noted that, before the language monitor 5 transmits an image data command to the printer 7, it transmits a status request command, obtains the status of the printer 7, and confirms that it is possible to transmit the image data command.

The control circuit 25 in the printer 7, when it receives the page end command, stores the image data in the FIFO memory. In addition, when the control circuit 25 receives the print start command, it instructs the printer engine 24 to start printing. When instructed to start printing, the printer engine 24 supplies paper and requests output of the image data when the paper reaches a predetermined position. When image data output is requested, the decoding circuit 23 reads out the compressed image from the FIFO memory 22, decodes the read out compressed image, and outputs the decoded image to the printer engine 24. At this time, the compressed image data read out from the FIFO memory 22 is removed from the FIFO memory 22.

In addition, when the language monitor 5 receives printer status indicating that the printing of the page has ended properly, the language monitor 5 also releases the corresponding page memory. In addition, when the language monitor 5 receives printer status indicating an error, the language monitor 5 also attempts to retransmit from the sheet that includes the page for which printing has not ended properly. Here, a sheet corresponds to a sheet of paper, and is composed of one page in single sided printing and two pages in double sided printing.

When the print commands for all the pages in the print job have been transmitted as described above, the language monitor 5 waits for the end of printing of all sheets in the job, and when printing of all sheets in the job has ended, ends the job.

Figure 3:
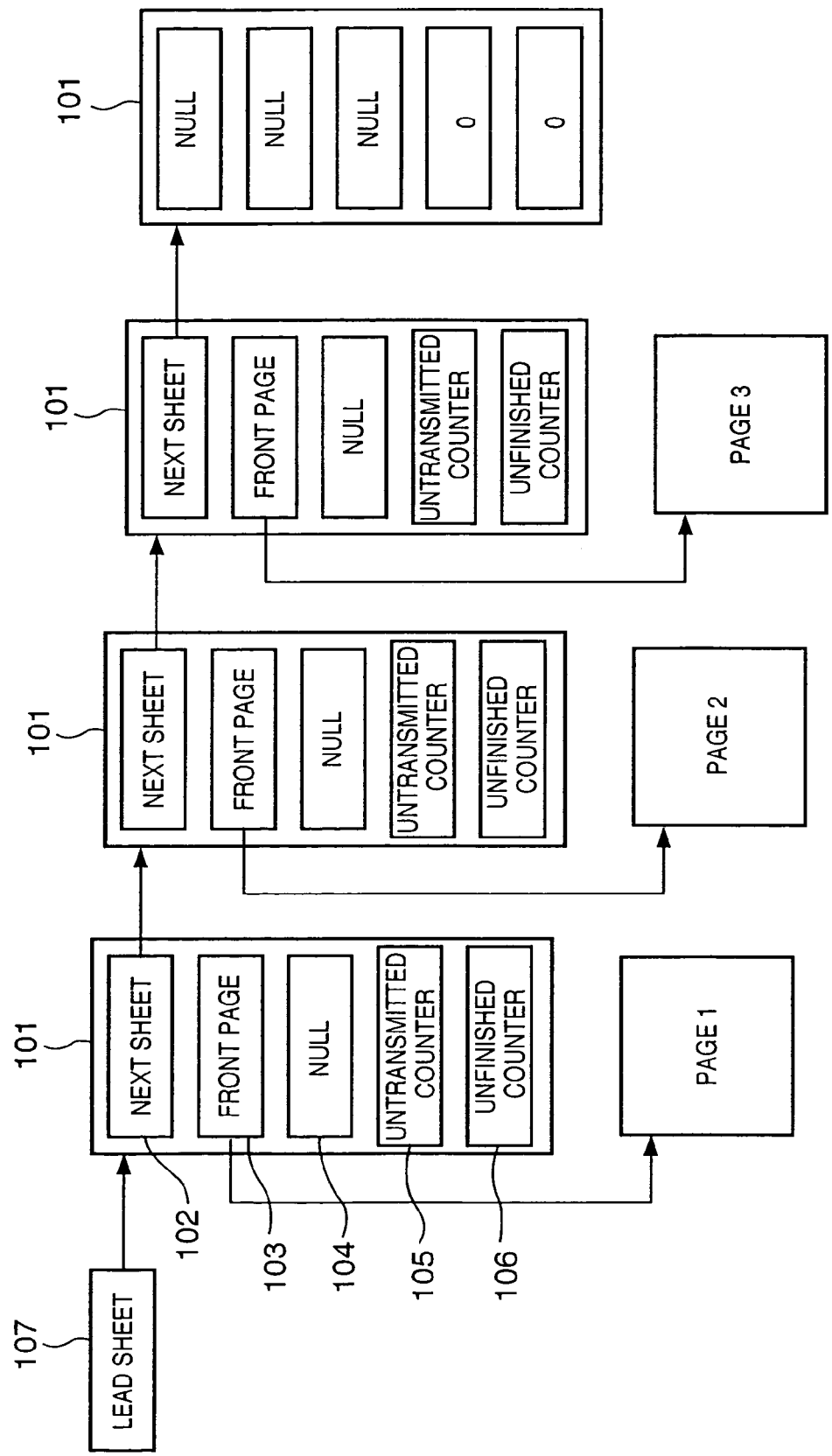
FIG. 3 is a diagram showing a data structure of a sheet management table during single sided printing in the present embodiment.
Figure 4:
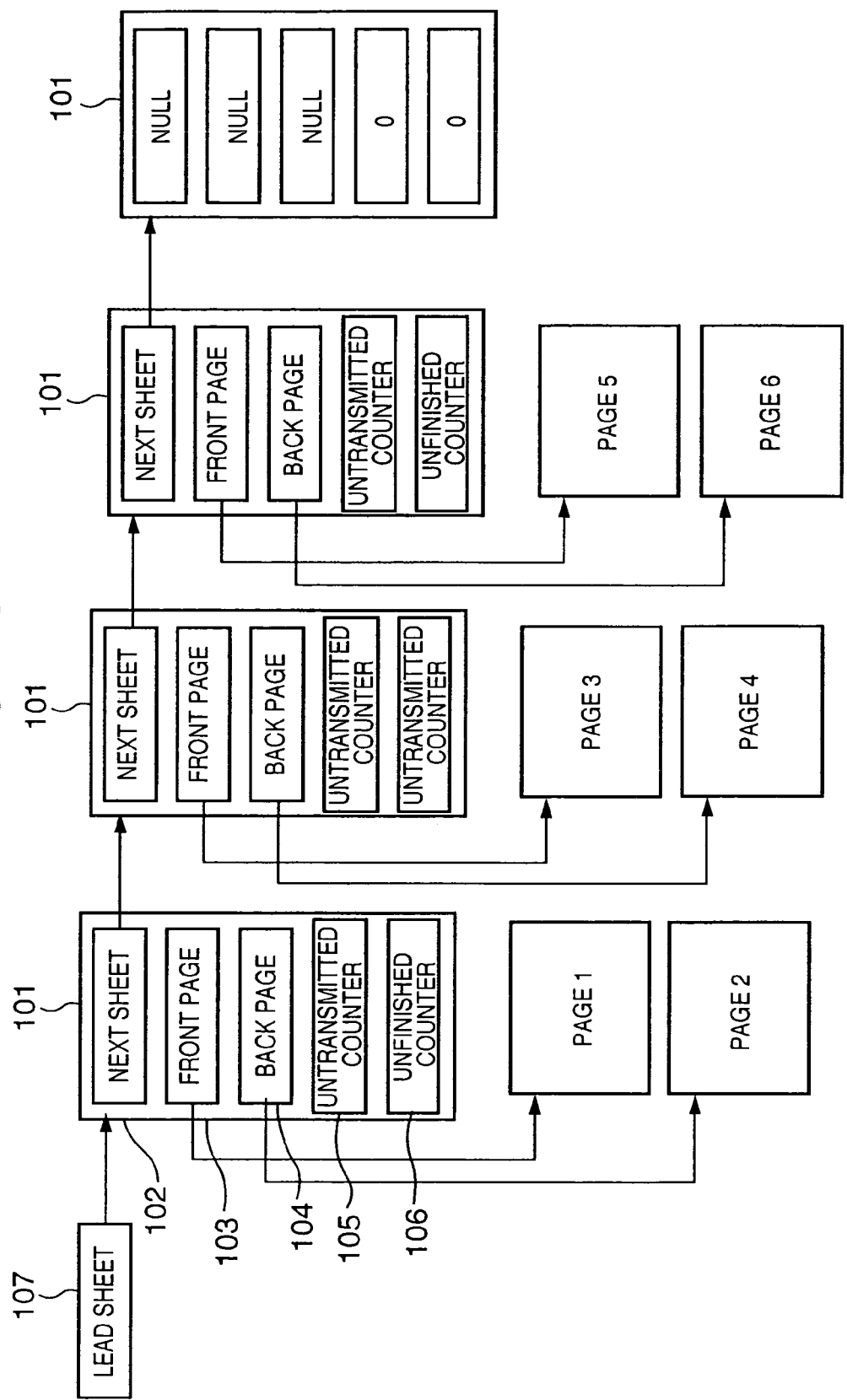
FIG. 4 is a diagram showing a data structure of a sheet management table during double sided printing in the present embodiment.

Next, a description is given of the data structure of sheet management table 101 that the language monitor 5 uses, with reference to FIG. 3 and FIG. 4. FIG. 3 shows an example of a single-sided, three-page job. FIG. 4 shows an example of a double-sided, six-page job. The sheet management table 101 includes a "next sheet" address 102 indicating the address (pointer) of the next sheet management table 101, a "front page" address 103 indicating the address of a data buffer of a front page, a "back page" address 104 indicating the address of a data buffer of a back page, an "untransmitted counter" 105 indicating the number of pages not yet transmitted, and an "unfinished counter" 106 indicting the number of pages not yet printed, and is comprised of a linear list created by a first sheet management table address 107 in the sequence received from the operating system 2 and the next sheet address 102. If the "next sheet" address 102 is NULL, this indicates that the next sheet management table 101 does not exist. In addition, if the front page address 103 is NULL, this indicates that that sheet is a blank sheet indicating the end of the job. In addition, if the back page address 104 is NULL, this indicates that there is no back page for that sheet and that the sheet is to be printed on one side only.

Figure 10A:
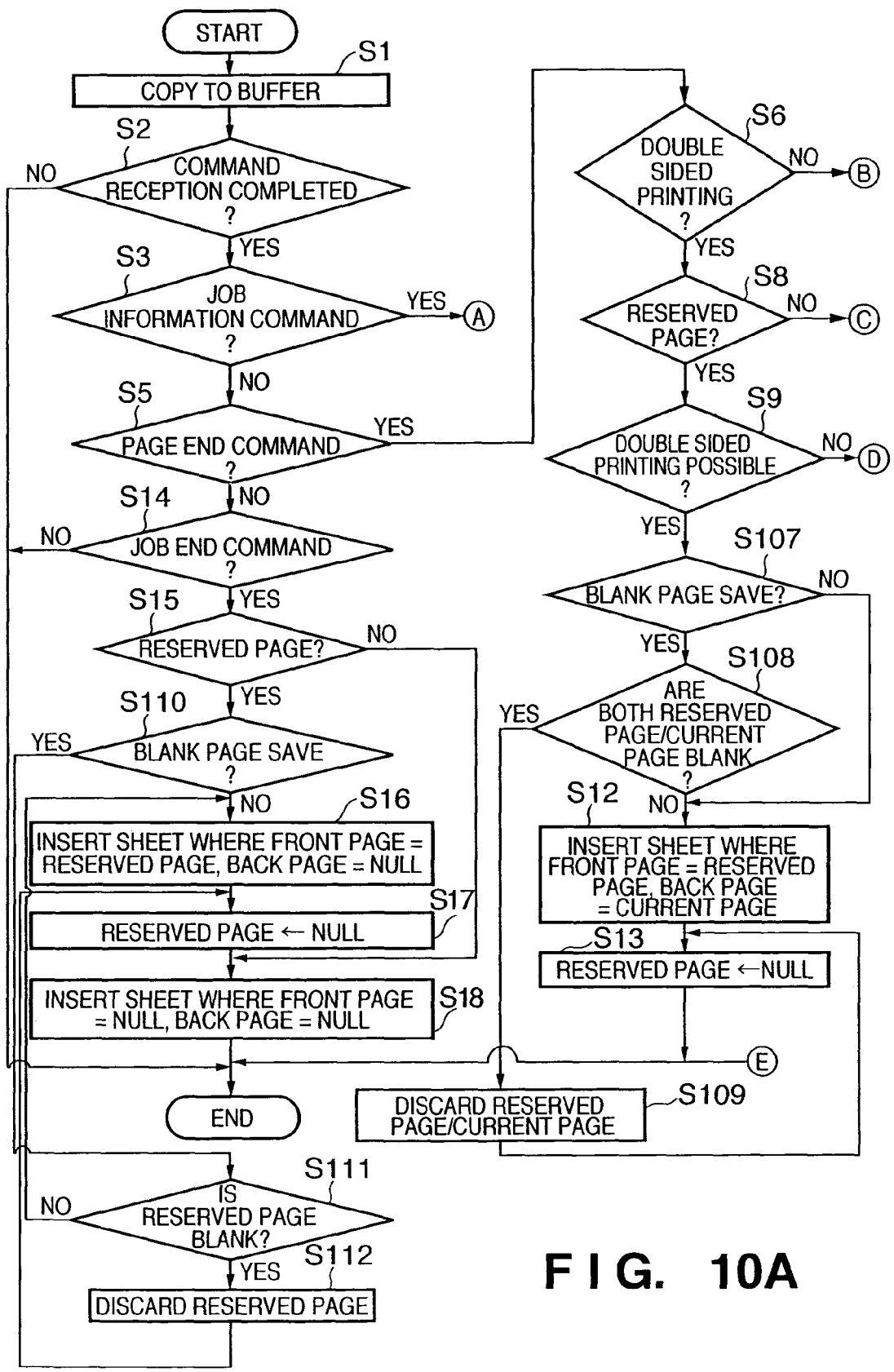
FIGS. 10A and 10B are flow charts illustrating processes carried out by a language monitor in the present embodiment.
Figure 10B:
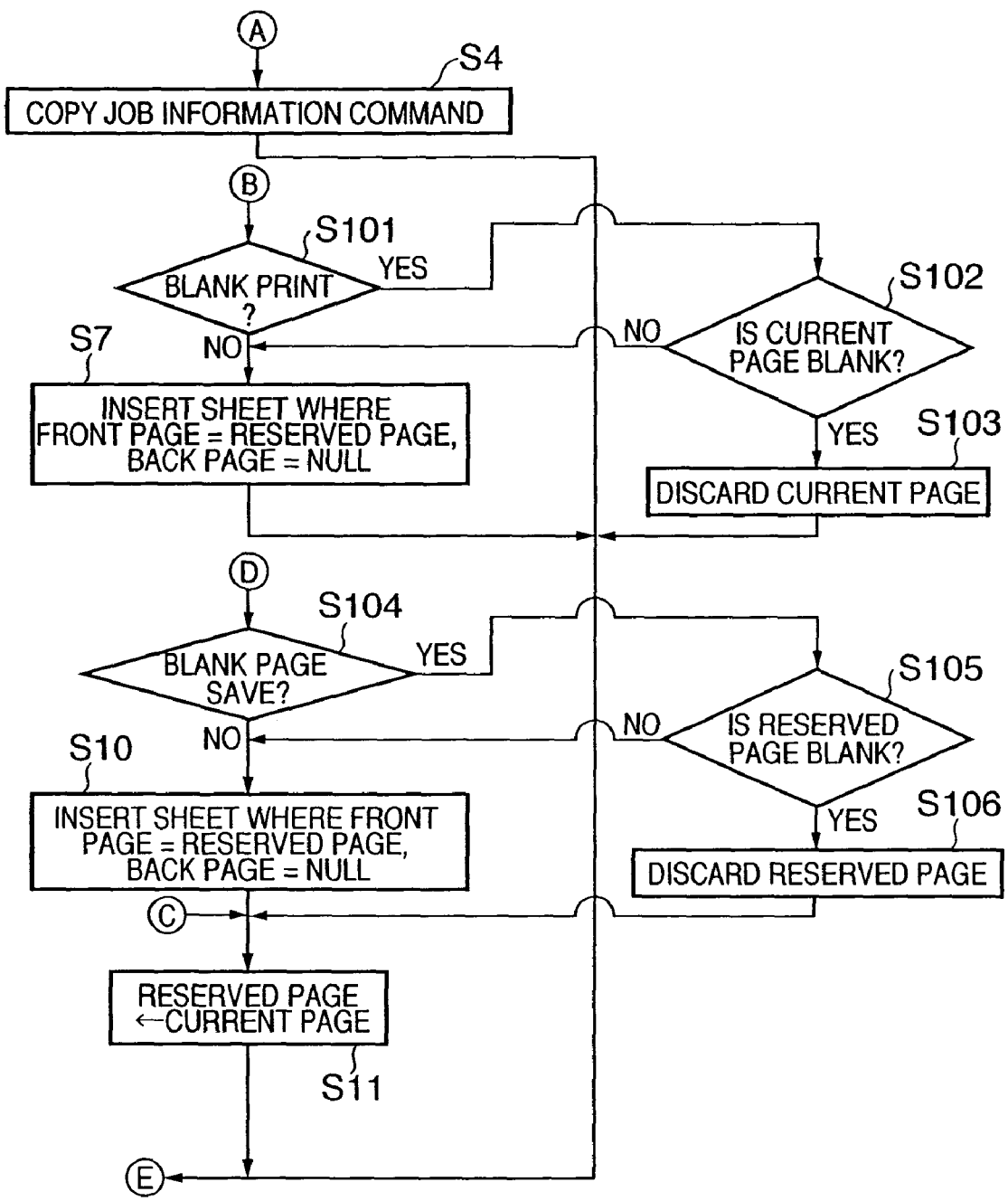

Next, a detailed description is given of a data reception process for the language monitor 5, in accordance with the flow chart shown in FIGS. 10A and 10B. It should be noted that, in the following description, it is assumed that whether or not to perform a blank page save is specified when the user prints from the application (it is assumed that the default setting is blank page save).

First, in step S1, the operating system 2 printer commands are copied to the buffer. Next, in step S2, it is determined if reception of one command has been completed. If a command is cut off midway and reception of a single command is not completed, processing is immediately terminated and the apparatus gets ready for reception of the next command. When reception of a single command is completed, in step S3 it is determined whether or not the command that is received is a job information command. If the command that is received is a job information command, the job information command received in step S4 is copied to the work area and the job information command is deleted from the buffer.

If it is determined that the command received in step S3 is not a job information command, processing then proceeds to step S5 and it is determined whether or no the command that is received is a page end command. If the command that is received is a page end command, then in step S6 it is determined if double sided printing is specified by the job information command. If double sided printing is not specified by the job information command, then in step S101 it is determined if blank page save has been specified. If blank page save has not been specified, then processing proceeds to step S7. If blank page save has been specified, then in step S102 it is determined if the current page is blank. If the current page is not blank, then processing proceeds to S7. If the current page is blank, then blank page save should be carried out and therefore in step S103 the memory area that is storing the current page is released and processing is terminated. In step S7, commands for one page in the buffer is copied and the commands in the buffer are deleted, the front page address 103 is set to the copied commands, the back page address 104 is set to NULL, the sheet management table 101 in which the unfinished counter 106 is set to the number of printed copies specified by the job information is added to the end of linear list of the sheet management table 101 and processing is terminated.

In step S6, if double sided printing is specified by the job information command, then in step S8 it is determined if there is a reserved page. Here, a reserved page is the front page of a double sided printing temporarily held. If there is no reserved page, then in step S11, a page of commands in the buffer are copied, the commands in the buffer are deleted from the buffer, the copied command address is stored as a reserved page and the process is terminated.

If there is a reserved page in step S8, then in step S9 it is determined whether or not double sided printing is possible with a combination of the reserved page that should be the front and the current page that should be the back.

The criteria for making such a determination may, for example, be the following:

Double sided printing is not possible if the paper size specified by the front page information command is not a size that permits double sided printing, such as A3, B4, A4 or B5.

Double sided printing is not possible if the paper size specified by the front page information command is not a type that permits double sided printing, such as plain paper.

Double sided printing is not possible if the paper size specified by the back page information command does not match the paper size specified by the front page information command.

Double sided printing is not possible if the paper type specified by the back page information command does not match the paper type specified by the front page information command.

Double sided printing is not possible if the paper supply source specified by the back page information command does not match the paper supply source specified by the front page information command.

Double sided printing is possible in any situation that does not match one of the foregoing.

If it is determined in step S9 that double sided printing is possible, then in step S107 it is determined if blank page save has been specified. If blank page save has not been specified, processing then proceeds to step S12. If blank page save has been specified, then in step S108 it is determined if both the reserved page and the current page are blank. If either the reserved page or the current page is not blank, processing then proceeds to step S12. If both the reserved page and the current page are blank, then blank page save should be carried out and therefore in step S109 the memory area storing the reserved page and the current page is released. Next, in step S13, NULL is stored in the reserved page address, indicating that there is no reserved page, and processing is terminated.

In step S12, a page of commands in the buffer are copied, the commands in the buffer are deleted from the buffer, the front page address is set to the reserved page address, the back page address is set to the copied commands, the sheet management table 101 in which the unfinished counter 106 is set to the number of printed copies specified by the job information is added to the end of the linear list of the sheet management table 101 and processing is terminated. At this time, in order to specify double sided printing, the paper ejection destination designation of the page information command of the back page specified by the back page address 104 is changed and set to the double face unit, and the paper supply source designation of the page information command of the back page specified by the front page address 103 is changed and set to the double-sided unit, respectively. Then, in step S13, NULL is stored in the reserve page address, indicting that there is no reserved page, and processing is terminated.

If in step S9 it is determined that double sided printing is not possible, then in step S104 it is determined if blank page save has been specified. If blank page save has not been specified, processing then proceeds to step S10. If blank page save has been specified, then in step S105 it is determined if the reserved page is blank. If the reserved page is not blank, processing then proceeds to step S10. If the reserved page is blank, then that means that both the front and the back are blank, and furthermore, blank page save should be carried out, and therefore the memory area storing the reserved page in step S106 is released and then, in step S11, commands for a single page in the buffer is copied, the commands in the buffer are deleted from the buffer, the address of the copied commands is stored as the reserved page and processing is terminated.

In step S10, in order to print on one side of the reserved page and at the same time make the current page the reserved page, commands for one page in the buffer is copied, the commands in the buffer are deleted from the buffer, the front page address 103 is set to the reserved page address, the back page address 104 is set to NULL, and the sheet management table 101 in which the unfinished counter 106 is set to the number of printed copies specified by the job information is added to the end of linear list of the sheet management table 101. Next, in step S11, a page of commands in the buffer are copied, the copied commands are deleted from the buffer, the address of the copied commands is saved as the reserved page and processing is terminated.

If in step S5 the command that is received is not a page end command, in step S14, it is determined if the command that is received is a job end command. If the command that is received is not a job end command, then the received command is a page information command or image data and reception of a page of commands is not yet completed, and therefore the command that is received is left as is in the buffer and processing is terminated.

If in step S14 the command that is received is a job end command, in step S15 it is then determined if there is a reserved page. If there is no reserved page, processing then proceeds directly to step S18. If there is a reserved page, then in step S110 it is determined if blank page save has been specified. If blank page save has not been specified, processing then proceeds to step S16. If blank page save has been specified, then in step S111 it is determined if the reserved page is blank. If the reserved page is not blank, processing then proceeds to step S16. If the reserved page is blank, then blank page save should be carried out, and therefore in step S112 the memory area holding the reserved page is released and processing proceeds to step S17.

In step S16, although double sided printing is specified there is no corresponding back side page, and therefore, in order to carry out single-face printing, the front page address 103 is set to the reserved page address, the back page address 104 is set to NULL, and the sheet management table 101 in which the unfinished counter 106 is set to the number of printed copies specified by the job information is added to the end of linear list of the sheet management table 101. Then, in step S17, NULL indicating that there is no reserved page is stored in the reserved page address and processing then proceeds to step S18.

In step S18, in order to finish the job, the sheet management table 101 in which the front page address 103 and the back page address 104 are set to NULL is address to the end of the linear list of the sheet management table 101.

Figure 5:
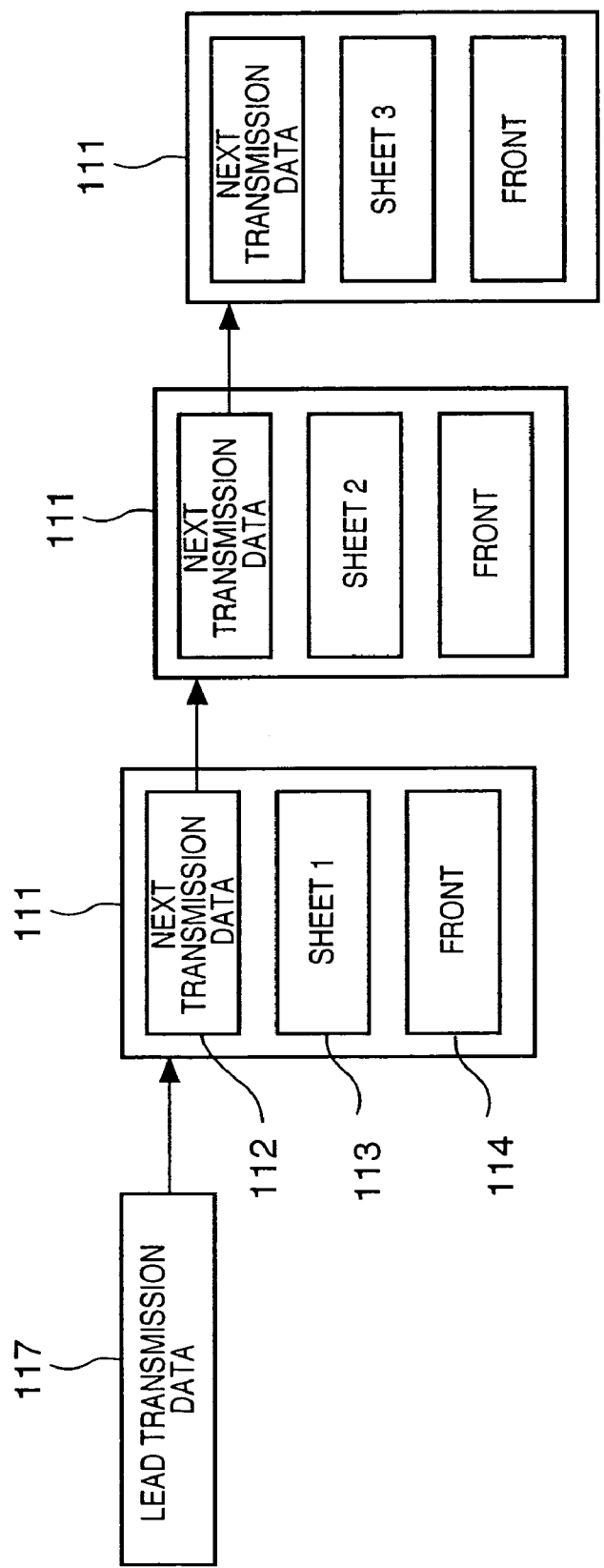
FIG. 5 is a diagram of a data structure of a transmission data management table for three single sided printing pages In the present embodiment.
Figure 6:
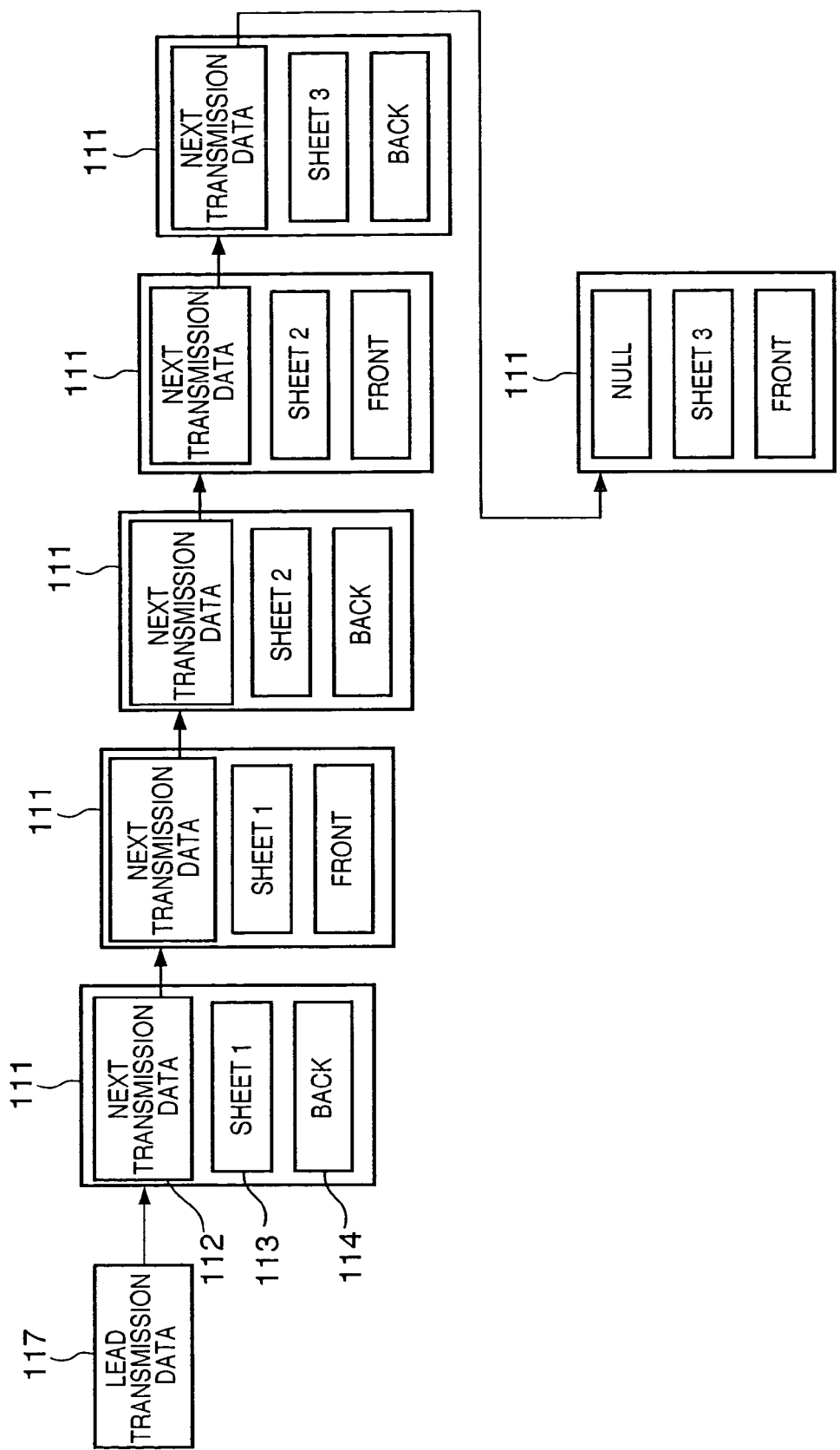
FIG. 6 is a diagram of a data structure of a transmission data management table for six double sided printing pages in the present embodiment.

Next, a description is given of the data structure of the transmission data management table 111 that the language monitor 5 uses, with reference to FIG. 5 and FIG. 6.

FIG. 5 shows an example of a single-sided three-page job and FIG. 6 shows an example of a double-sided, six-page job (retaining one sheet), respectively. The transmission data management table 111 is comprised of a next transmission data address 112 indicating the address of the next transmission data management table 111, a sheet management table address 113 indicting the address of the sheet management table 101 corresponding to that transmission data management table 111, and a transmission data category 114 indicating whether the transmission data management table 111 type is a single sided printing, the front page of a double sided printing, the back page of a double sided printing or an empty table where the back page should go in the case of double sided printing when retaining two sheets, and comprises a linear list composed of a first transmission data management table 111 address 117 containing a page number, not shown, determined according to a processing procedure to be described later and in the order in which printing is carried out, and a next transmission data address 112. In the embodiment, face-down paper ejection is carried out, and therefore, because the back is printed before the front, in FIG. 6 the back side of a sheet goes ahead of the front side of that same sheet.

Next, a description is given of the printing order in double sided printing in double-sheet retention alternating paper supply, with reference to FIG. 14. FIG. 14 shows a table indicating the relation between printing order and page in double sided printing of double-sheet retention alternating paper supply. When performing double sided printing, after printing the back and before starting to print the front, it is necessary to carry out a so-called re-supply of the paper, in which the sheet of paper is conveyed to a photosensitive drum after the front edge and the back edge of the paper have been inverted. Since printing cannot be carried out during this time in double sided printing of single-sheet retention, the speed of printing slows. In double sided printing in double-sheet retention alternating paper supply, in order to solve this problem, the speed of printing is not slowed because printing of a different sheet is done using the time in which the above-described inversion and re-supply of paper is carried out. Specifically, printing is carried out using rules like the following:

2-page printing of another sheet during1 printing of back and printing of front of same sheet.

Printing of back and printing of front carried out alternately.

However, although the page corresponding to transmission number 2 is the front of the first sheet 1, since no such page exists printing cannot be carried out, and this time is left open.

In addition, although the page corresponding to transmission number 7 is the back of sheet 4, since no such page exists printing cannot be carried out, and this time is left open.

When carrying out double-sheet retention alternating paper supply double sided printing, an upper limit is placed on the length of the sheet by such restrictions as the length of the paper feed path, and thus, with paper that is longer than the horizontal feed, for example A4, double-sheet retention alternating paper supply double sided printing cannot be carried out. In such cases, double sided printing with single-sheet retention is carried out.

When carrying out double-sheet retention alternating paper supply double sided printing, sheets of different paper sizes of paper types printing cannot be printed together.

Figure 7:
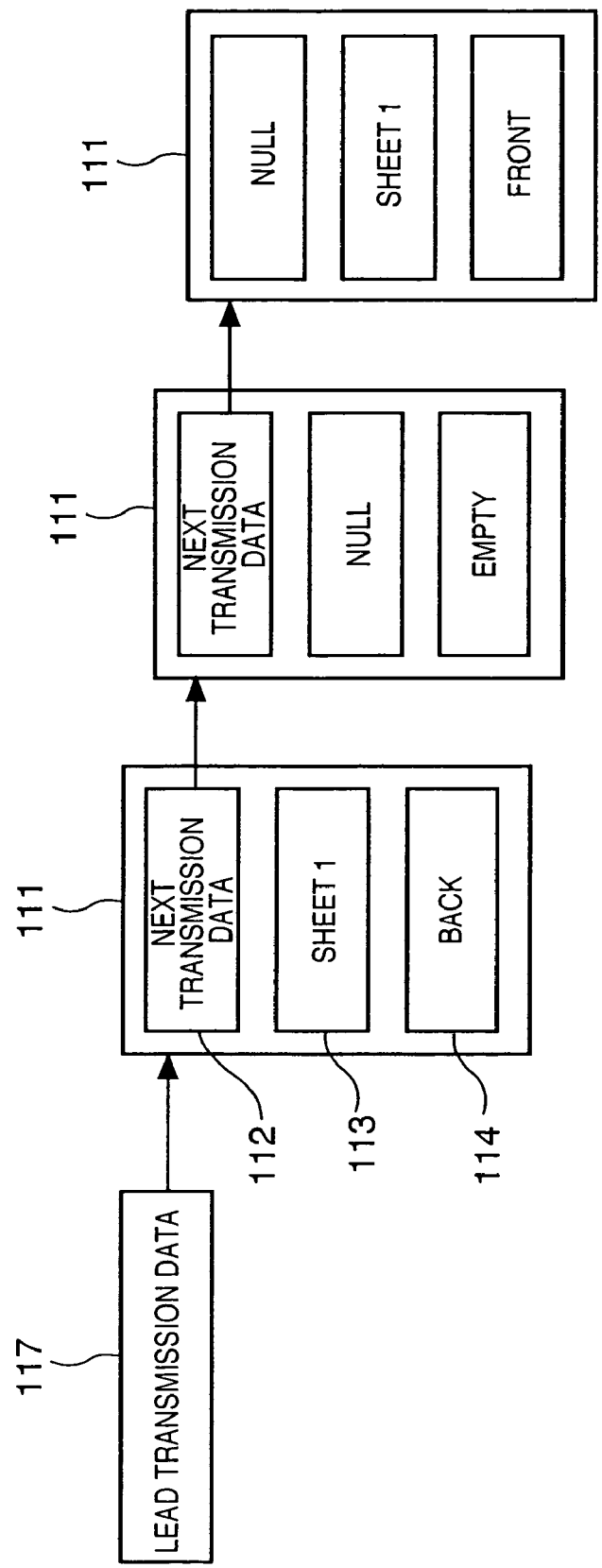
FIG. 7 is a diagram showing a transmission data management table for up to two pages in double sided printing of double-sheet retention alternating paper supply.

Next, a description is given of a method of composing the transmission data management table 111 in double sided printing of double-sheet retention alternating paper supply with reference to FIG. 7, FIG. 8 and FIG. 9.

FIG. 7 illustrates a state in which two pages of transmission data are registered. FIG. 8 illustrates a state in which four pages of transmission data are registered. FIG. 9 shows a state in which six pages of transmission data are registered. When the first two pages are registered, as shown in FIG. 7, the transmission data management table 111 is composed in the order of the back of the first sheet, empty, the front of the first sheet 1. These correspond to transmission numbers 1, 3 and 4, respectively, in FIG. 14.

To register the next two pages, the transmission data management table 111 is searched and, as shown in FIG. 8, the searched empty transmission data management table 111 is changed to the back page of the second sheet, and the empty transmission data management table 111 and the transmission data management table 111 of the front page of the second sheet are added, in that order, to the end.

Similarly, to registering the next two pages, the transmission data management table 111 is searched and, as shown in FIG. 9, the searched and empty transmission data management table 111 is changed to the back page of the third sheet, and the empty transmission data management table 111 and the transmission data management table 111 of the front page of the third sheet are added, in that order, to the end.

Next, a detailed description is given of the transmission data registration process of the language monitor 5. It should be noted that the transmission data registration process operates in parallel with the data reception process.

When the transmission data registration process is activated, first, in step S31, it is determined if a sheet management table 101 is present. Specifically, when the lead sheet management table address 107 is NULL, the sheet management table 101 does not exist, and therefore processing returns to step S31.

If the lead sheet management table address 107 is not NULL, the sheet management table 101 exists, and in step S32 the lead sheet management table address 107 is stored in the sheet address. Next, in step S33, it is determined if the sheet management table 101 that the current sheet address indicates is an empty sheet indicating the end of the job. Specifically, when the front page address 103 is not NULL, the current sheet is not an empty sheet, and therefore, in step S34, the unfinished counter 106 of the current sheet management table 101 is copied to the untransmitted counter 105. Next, in step S35, it is determined if an error (a printing paper jam or the like) has occurred. It should be noted that information indicating whether or not an error has occurred is acquired by a processing procedure to be described later. If an error has occurred, then, since the transmission of data must be redone, processing returns to step S31. If an error has not occurred, then in step S36 it is determined if the current sheet is a sheet that is to be printed on one side only. Specifically, if the back page address 104 of the current sheet management table 101 is NULL, then the current sheet is a sheet to be printed on one side and in step S37 the transmission data management table 111 is searched. If the searched transmission data management table 111 is an empty transmission data management table 111, then there is a shift from double-sheet retention double sided printing to single sided printing, and because that empty space cannot be used it is deleted. Next, processing proceeds to step S47.

If in step S36 the current sheet management table 101 back page address 104 is not NULL, then the current sheet is a sheet that is to be printed on both sides, and therefore, in step S38, it is determined if double sided printing with double-sheet retention is possible. Specifically, if the current sheet paper size is neither A4 nor B5, for example, then double sided printing with double-sheet retention is not possible, and thus in step S39 the transmission data management table 111 is searched. If the searched transmission data management table 111 is an empty transmission data management table 111, then there is a shift from double-sheet retention double sided printing to single-sheet retention double sided printing, and since that empty space cannot be used it is deleted. Next, in step S40, the sheet management table address is set as the current sheet address, the transmission data management table 111 in which the transmission data category 114 is set to the back page is added to the end of the linear list of the transmission data management table 111, and processing proceeds to step S47.

In step S38, if the current sheet paper size is A4 or B5, for example, then double sided printing with double-sheet retention is possible, and therefore in step S41 the transmission data management table 111 is searched. If the searched transmission data management table 111 is not an empty transmission data management table 111, processing then proceeds to step S45. If the transmission data management table 111 is an empty transmission data management table 111, then in step S42 it is determined if the empty table can be used, that is, it is determined if double-sheeted retention double sided printing mixing the pages of the preceding sheet can be continued. Specifically, if the last transmission data management table 111 page paper size and paper type match the current sheet paper size and paper type, respectively, then it is possible to continue printing with mixing, and, since the empty table can be used, in step S43 the searched transmission data management table 111 sheet management table address 113 is set to the current sheet address and the transmission data category 114 is set to the back page, respectively, and processing then proceeds to step S46.

In step S42, if the paper size or the paper type of the page of the last transmission data management table 111 does not match the paper size or the paper type of the current sheet, then mixing and printing cannot be continued and an empty table cannot be used, and therefore in step S44 the transmission data management table 111 is searched and if there is an empty transmission data management table 111 it is deleted. Processing then proceeds to step S45.

In step S45, the sheet management table address 113 is set to the current sheet address, the transmission data management table 111 in which the transmission data category 114 is set to the back page is added to the end of the linear list of the transmission data management table 111, and processing then proceeds to step S46.

In step S46, the sheet management table address 113 is set to NULL, the transmission data management table 111 in which the transmission data category 114 is set to the empty table is added to the end of the linear list of the transmission data management table 111 and processing then proceeds to step S47.

In step S47, the sheet management table address 113 is set to the current address and the transmission data management table 111 in which the transmission data category 114 is set to the front page is added to the end of the linear list of the transmission data management table 111. Then, in step S48, the current sheet management table 101 is subtracted from the untransmitted counter 105 and in the next step, S49, it is determined if the untransmitted counter 105 of the current sheet management table 101 is 0. If the untransmitted counter 105 of the current sheet management table 101 is not 0, then processing returns to step S35 and current sheet transmission data registration continues. If the untransmitted counter 105 of the current sheet management table 101 is 0, then the transmission data registration for that sheet has been carried out a number of times that corresponds to the number of printed copies specified, and thus in step S50 it is determined if a next sheet management table 101 is present. Specifically, if the next sheet address 102 of the current sheet management table 101 is not NULL, then a next sheet management table 101 exists, and in step S51 the next sheet address 102 of the current sheet management table 101 is stored in the current sheet address. Next, processing returns to step S33 and next sheet transmission data registration is started.

If in step S50 the next sheet address 102 of the current sheet management table 101 is NULL, then a next sheet management table 101 does not exist, and thus, in step S52, it is determined if an error has occurred. If an error has occurred, processing then returns to step S31. If an error has not occurred, then processing returns to step S50 and either the next sheet management table 101 is added or the processes of from step S50 to step S52 are repeated until an error occurs.

If in step S33 the front page address 103 is NULL, then the current sheet is an empty sheet indicating the end of the job, and in step S52, it is determined if an error has occurred. If an error has occurred, processing returns to step S31. If an error has not occurred, then in step S54 it is determined if printing is completed. Specifically, if the lead sheet management table 107 is the current sheet address, that is, is the equivalent of the address of an empty sheet indicating the end of a job, then, by the end of printing, the sheet management tables 101 other than the empty sheet are all deleted according to a processing procedure to be described later, and therefore in step S55 a job termination process is carried out. Here, processes such as empty sheet deletion are carried out before printing the work area, and processing returns to step S31.

If in step S54 the lead sheet management table 107 is not the equivalent of the current sheet address, then printing is not completed, processing returns to step S53, and either printing is completed or the processes from step S53 to step S54 are repeated until an error occurs.

Figure 12:
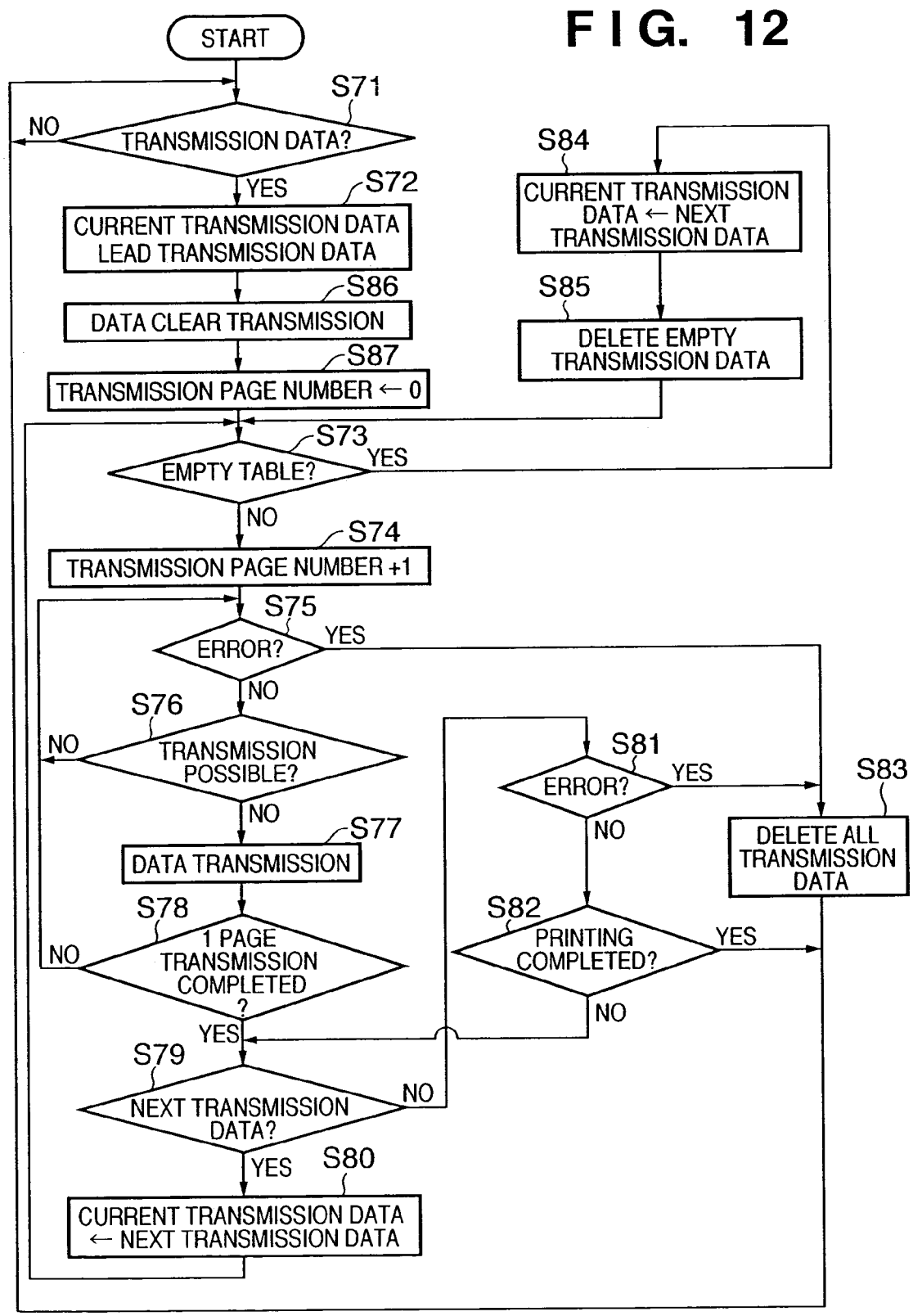
FIG. 12 is a flow chart illustrating a data transmission process carried out by the language monitor in the present embodiment.

Next, a detailed description of the data transmission process of the language monitor 5 is given, with reference to FIG. 12. It should be noted that the data transmission process operates in parallel with the data reception process and the transmission data registration process.

When the data transmission process is activated first, in step S71, it is determined if transmission data is present. Specifically, when the lead transmission data management table address 117 is NULL, there is no transmission data management table 111 and therefore processing returns to step S71.

If the transmission data management table address 117 is not NULL, then the transmission data management table 111 exists, and therefore in step S72 the lead transmission data management table address 117 is stored in the current transmission data management table address. Next, in step S86, a data clear command is transmitted to the printer 7. When the printer 7 receives the data clear command, already-received print data is discarded and at the same time the page number held internally is initialized to 0. Next, in step S87, value "0" is stored in the transmission page number.

Next, in step S73, it is determined if the current transmission data management table transmission data category 114 is an empty table. If the current transmission data management table transmission data category 114 is not an empty table, then in step S74, value "1" is added to the transmission page number and stored in the current transmission data management table transmission page number, not shown. Next, in step S75, it is determined if an error has occurred. If an error has not occurred, then in step S76 it is determined if it is possible to transmit a command. It should be noted that the information that indicates whether or not it is possible to transmit a command is acquired by a processing procedure to be described later. If a command cannot be transmitted, then processing returns to step S75 and the processes of step S75 and S76 are repeated until it becomes possible to transmit a command or an error occurs.

If in step S76 it is determined that the command can be transmitted, then in step S77, according to whether the transmission data category 114 is the front page or the back page, of the commands stored in the data buffer that the sheet management table address 113 indicates, the untransmitted lead command is transmitted to the printer. Next, in step S78, it is determined if transmission of a single page of commands stored in the data buffer is all completed. If transmission of a single page of commands stored in the data buffer is not all completed, then processing returns to step S75 and command transmission continues. If transmission of a single page of commands stored in the data buffer is all completed, then in step S79 it is determined if a next transmission data management table 111 is present. Specifically, if the next transmission data address 113 is NULL, then the next transmission data management table 111 exists, and therefore in step S80 the next transmission data address 113 is stored in the current transmission data management table address and processing returns to step S73. If in step S79 the next transmission data address 113 is NULL, then there is no next transmission data management table 111, and therefore in step S81, it is determined if an error has occurred. If an error has occurred, then data transmission must be redone and thus processing returns to step S83, all transmission data management tables 111 are deleted and processing returns to step S71. If an error has not occurred, processing then proceeds to step S82 and it is determined if printing is completed. If printing is completed, processing returns to step S71. If printing is not completed, then processing returns to step S79 and the processes of steps S79 to S82 are repeated until either the next transmission data management table 111 is added, printing is completed, or an error occurs.

If in step S73 the transmission data category 114 of the current transmission data management table is an empty table, then the current transmission data management table next transmission data management table transmission data should be transmitted, and since an empty table cannot be used, in step S84 the next transmission data address 113 is stored in the current transmission data management table address. In step S85, the current transmission data management table 111, that is, the empty table, is deleted, and processing returns to step S73.

Next, a detailed description is given of a status monitoring process of the language monitor 5, with reference to FIG. 13. It should be noted that the status monitoring process operates in parallel with the data transmission process, the transmission data registration process and the data transmission process.

When the status monitoring process is activated, first, in step S91, the printer status is acquired. Specifically, the printer status is received by transmitting a status request command to the printer 7. At least the following information is included in the printer status:

Whether or not the printer 7 being in error status.
Whether or not page information commands can be received.
Whether or not image data commands can be received.
The page number of any page that has been printed.

Next, in step S92, it is determined if an error has occurred. If an error has occurred, processing returns to step S91. If an error has not occurred, then in step S93 it is determined if the printed page number has changed from the value previously required. If the printed page number has not changed from the value previously acquired, processing returns to step S91. If the printed page number has changed from the value acquired previously, then in step S94 it is determined if the printed page is the front. Specifically, if the transmission data category of the printed transmission data management table 111 is not the front page, then the printed page is not the front and thus processing proceeds to step S98. If the transmission data category 114 of the printed transmission data management table 111 is the front page, then in step S95, value "1" is subtracted from the unfinished counter 106 of the sheet management table 101 indicated by the printed transmission data management table 111 sheet management table 101. Next, in step S96, it is determined if the unfinished counter 106 is 0. If the unfinished counter 106 is not 0, processing proceeds to step S98. If the unfinished counter 106 is 0, then printing of the specified number of copies is completed and in step S97 the sheet management table 101 that the sheet management table 113 of the printed transmission data management table 111 indicates is deleted. At this time, if the data buffer that the front page address 103 indicates and the back page address 104 are not NULL, then the data buffer that the back page address 104 indicates is released. Next, processing proceeds to step S98.

In step S98, the printed transmission data management table 111 is deleted, processing returns to step S91 and the foregoing monitoring process is repeated.

Thus, as described above, with the present embodiment, because no output is attempted when both the front and the back are blank when blank page save is carried out in double sided printing, the front and back sides do not get out of order and an output not intended by the user can be avoided.

Figure 17:
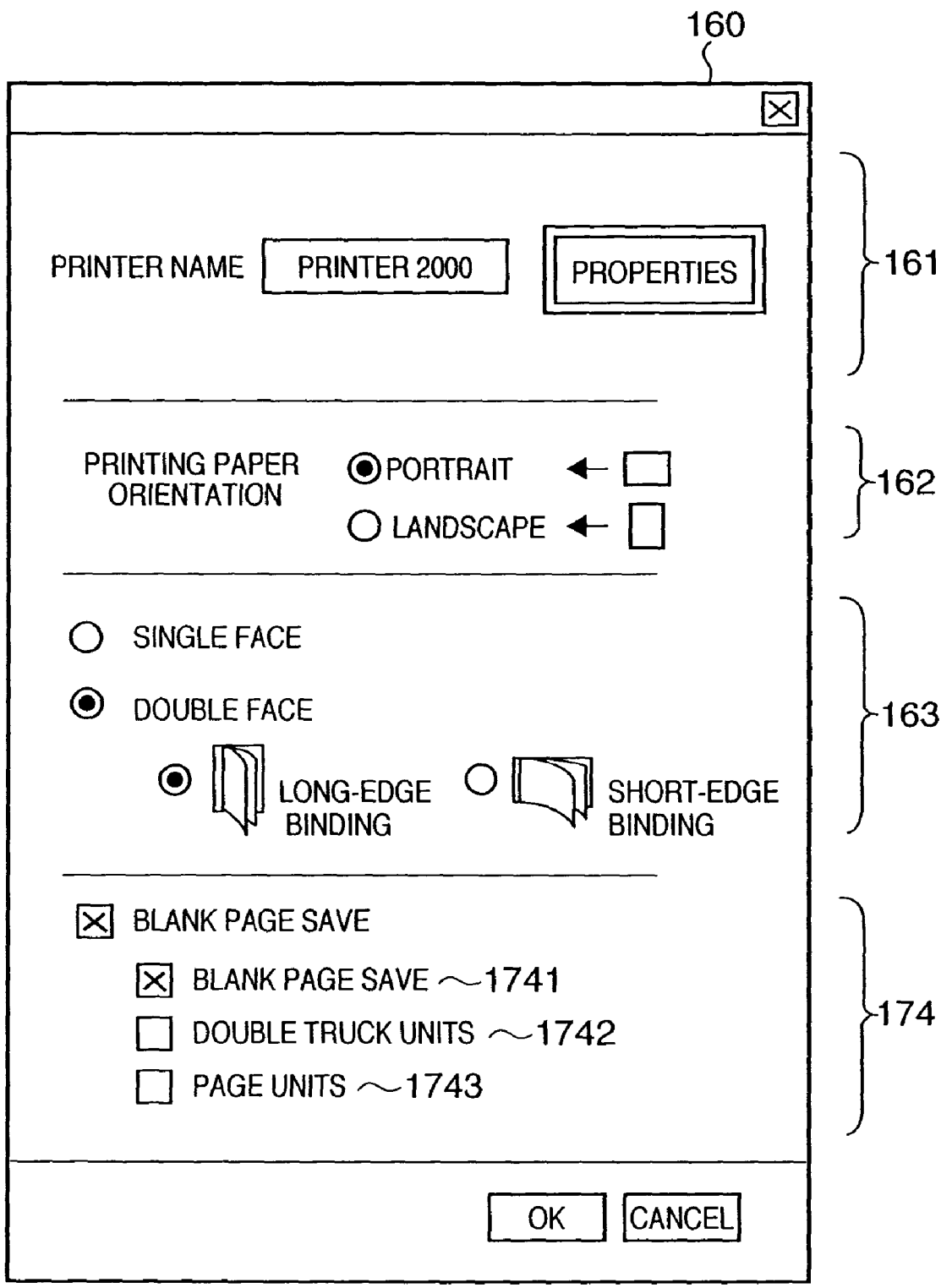
FIG. 17 is a diagram showing another sample setup window displayed when printing in the present embodiment.

It should be noted that, although in the foregoing embodiment the identification of a blank is always made in units of sheets, alternatively, as shown in FIG. 17, selection means may be provided to the user for carrying out blank page save in either page units (1743), sheet units (1741), or double truck units (1742), with identification of a blank carried out in page units when performance in page units is selected, in sheet units when performance in sheet units is selected, and in double truck units when performance in double truck units is selected.

Figure 15A:
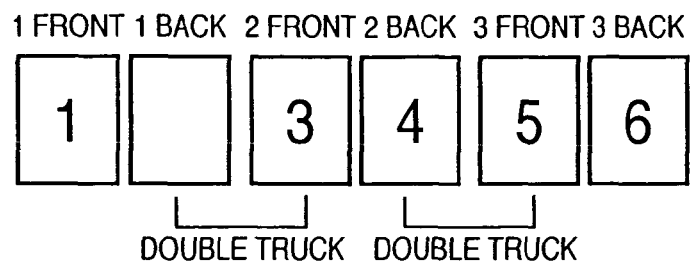
FIGS. 15A through 15F are diagrams showing the problem with a blank page save process.
Figure 15B:
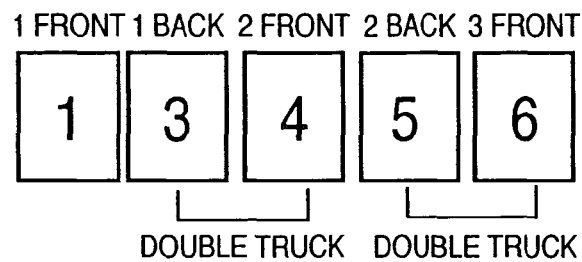

When performance in page units (1743) is specified, if the print data is like that shown in FIG. 15A, for example, then it is printed out as shown in FIG. 15B. If the print data is like that shown in FIG. 15C, then it is printed out as shown in FIG. 15D. If the print data is like that shown in FIG. 15E, then it is printed out as shown in FIG. 15F.

Figure 15C:
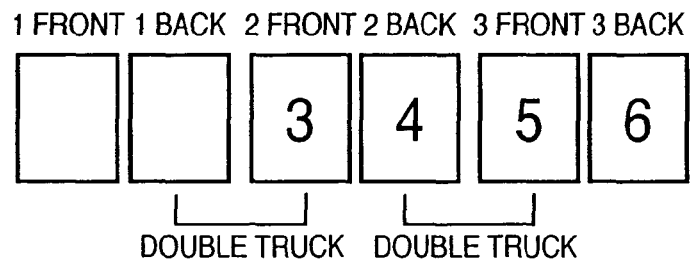
Figure 15D:
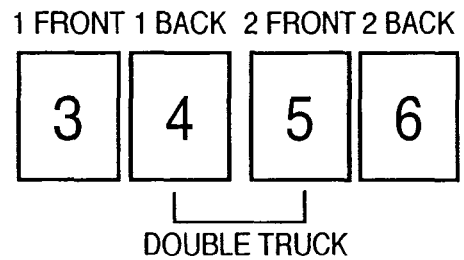

When performance in sheet units (1741) is specified, if the print data is like that shown in FIG. 15C, for example, then it is printed out as shown in FIG. 15D. However, if the print data is as shown in 15A, then it is printed as shown in FIG. 15A, and if the print data is as shown in FIG. 15E, then it is printed as shown in FIG. 15E.

Figure 15E:
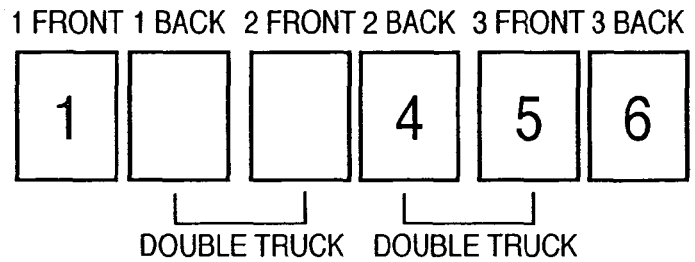
Figure 15F:
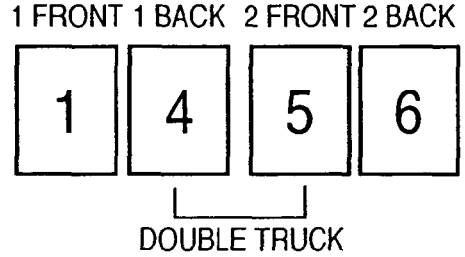

When performance in double truck units (1742.) is specified, if the print data is like that shown in FIG. 15E, for example, then it is printed out as shown in FIG. 15F. However, if the print data is as shown in FIG. 15A, then it is also printed as shown in FIG. 15A, and if the print data is as shown in FIG. 15C, then it is also printed as shown in FIG. 15C.

In addition, although in the foregoing embodiment the blank page save determination is carried out on the host side, alternatively, this determination may be carried out on the printer side. In order to do so on the printer side, on the PC side the print data is transmitted to the printer in page order regardless of whether or not there is a blank page. Then, on the printer side, a certain amount of buffer memory is prepared and the print data stored there temporarily, a determination is made as to whether the print is a double-sided print or a single-sided print, and if the print is a double-sided print, the printing process is carried out in a printing order like that described above, such that, if both the front and the back are blank pages, the print data for that page is deleted from the buffer.

In addition, although the embodiment is described using an example of a printer that outputs face down in a single-sided print, by switching the order of output of the front and back pages the present invention can be adapted to a face-up printer. This switch may be made according to the type of printer.

In addition, as described in the foregoing embodiment, most of the processing in a case in which the PC side does most of the work is done by the printer driver and the language monitor. The language monitor 5 ordinarily is installed in the system together with the printer driver, and the language monitor 5, being also one program that comprises the printer driver, in a broad sense means the printer driver.

In addition, since ordinarily a computer program can be executed by a CDROM or other such computer-readable storage medium being set in a PC and copied to or installed in the system, such a computer-readable storage medium is itself also within the scope of the present invention.

Thus, as described above, with the present invention, because no output is attempted when both the front and the back are blank when blank page save is carried out in double sided printing, the front and back sides do not get out of order and an output not intended by the user can be avoided.

As many apparently widely different embodiments of the present invention can be made without departing from the spirit and scope thereof, it is to be understood that the invention is not limited to the specific preferred embodiments described above thereof except as defined in the claims.

CLAIM OF PRIORITY

This application claims priority from Japanese Patent Application No. 2004-198142 filed on Jul. 5, 2004, the entire contents of which are hereby incorporated by reference herein.

What is claimed is:

1. An information processing apparatus that generates print data and transmits the print data to a printer that performs double side printing on a sheet, said apparatus comprising:
 a selection unit that selects blank page save in either sheet units or double truck units;
 a print data generation unit that, in a case where the blank page save in sheet units is selected by said selection unit, generates print data for both sides of a sheet of interest if both sides of the sheet of interest are not blank, and does not generate print data for both sides of the sheet of interest if both sides of the sheet of interest are blank, while, in a case where the blank page save in double truck units is selected by said selection unit, generates print data so that no image is printed on a front side and a back side of a first sheet and an image is printed on a front side of a second sheet following on the first sheet if a front side image and a back side image of the first sheet are blank and the front side image of the second sheet following to the first sheet is not blank, and does not generate print data for the back side of the first sheet and the front side of the second sheet if the back side image of the first sheet and the front side image of the second sheet are blank.

2. The apparatus according to claim 1, further comprising a management data generation unit that generates transmission order data for managing transmission order of print data of each page generated by said print data generation unit
wherein, if the printer is a type of device that retains two sheets on a convoy path for double-side printing, said management data generation unit generates transmission order data in an order of a back side page, a blank page and a front side page from first sheet, and, after the second sheet, generates the transmission order data by replacing the immediately before generated blank page with the back side page, then adding a blank page and the front side page.

3. The apparatus according to claim 1, further comprising a management data generation unit that generates transmission order data for managing transmission order of print data of each page generated by said print data generation unit,
wherein, if the printer is a type of device that retains a single sheet on a convoy path for double-sided printing, said management data generation unit generates transmission order data in an order of a back side page and a front side page for each sheet, while, if the printer is a type of device that retains two sheets on a convoy path for double-side printing, said management data generation unit generates transmission order data in an order of a back side page, a blank page and a front side page from a first sheet, and, after the second sheet, generates the transmission order data by replacing the immediately before generated blank page with the back side page, then, adding a blank page and the front side page.

4. The apparatus according to claim 1, wherein said selection unit can designate the blank page save in page units,
wherein, in a case where the blank page save in page units is selected by said selection unit, said print data generation unit generates print data of a page of interest if the page of interest is not blank, and does not generate print data of the page if the page of the interest is blank.

5. A method for an information processing apparatus that generates print data and transmits the print data to a printer that performs double side printing on a sheet, said method comprising:
a designation step of designating blank page save in either sheet units or double truck units;
a print data generation step that, in a case where the blank page save in sheet units is selected by said selection unit, generates print data for both sides of a sheet of interest if both sides of the sheet of interest are not blank, and does not generate print data for both sides of the sheet of interest if both sides of the sheet of interest are blank, while, in a case where the blank page save in double truck units is selected by said selection step, generates print data so that no image is printed on a front side and a back side of a first sheet and an image is printed on a front side of a second sheet following on the first sheet if a front side image and a back side image of the first sheet are blank and the front side image of the second sheet following to the first sheet is not blank, and does not generate print data for the back side of the first sheet and the front side of the second sheet if the back side image of the first sheet and the front side image of the second sheet are blank.

6. The method according to claim 5, further comprising a management data generation step that generates transmission order data for managing transmission order of print data of each page generated by said print data generation step,
wherein, if the printer is a type of device that retains two sheets on a convoy path for double-side printing, said management data generation step generates transmission order data in an order of a back side page, a blank page and a front side page from a first sheet, and, after the second sheet, generates the transmission order data by replacing the immediately before generated blank page with the back side page then adding a blank page and the front side page.

7. The method according to claim 5, further comprising a management data generation step that generates transmission order data for managing transmission order of print data of each page generated by said print data generation step,
wherein, if the printer is a type of device that retains a single sheet on a convoy path for double-sided printing, said management data generation step generates transmission order data in an order of a back side page and a front side page, while, if the printer is a type of device that retains two sheets on a convoy path for double-side printing, said management data generation step generates transmission order data in an order of a back side page, a blank page and a front side page from first sheet, and, after the second sheet, generates the transmission order data by replacing the immediately before generated blank page with the back side page, then adding a blank page and the front side page.

8. The method according to claim 5, wherein said designation step can designate the blank page save in page units,
wherein, in a case where the blank page save in page units is selected by said designation step, said print data generation step generates print data of a page of interest if the page of interest is not blank, and does not generate print data of the page if the page of the interest is blank.

9. A computer-readable storage medium storing a computer-executable program for an information processing apparatus that generates print data and transmits the print data to a printer that performs double side printing on a sheet, said program comprising:
a designation step of designating blank page save in either sheet units or double truck units;
a print data generation step that, in a case where the blank page save in sheet units is selected by said designation step, generates print data for both sides of a sheet of interest if both sides of the sheet of interest are not blank, and does not generate print data for both sides of the sheet of interest if both sides of the sheet of interest are blank, while, in a case where the blank page save in double truck units is selected by said designation step, generates print data so that no image is printed on a front side and a back side of a first sheet and an image is printed on a front side of a second sheet following on the first sheet if a front side image and a back side image of the first sheet are blank and the front side image of the second sheet following to the first sheet is not blank, and does not generate print data for the back side of the first sheet and the front side of the second sheet if the back side image of the first sheet and the front side image of the second sheet are blank.

10. The computer-readable medium according to claim 9, further comprising a management data generation step that generates transmission order data for managing transmission order of print data of each page generated by said print data generation step, wherein, if the printer is a type of device that retains two sheets on a convoy path for double-side printing, said management data generation step generates transmission order data in an order of a back side page, a blank page and a front side page from first sheet, and, after the second sheet, generates the transmission order data by replacing the immediately before generated blank page with the back side page, then adding a blank page and the front side page.

11. The computer-readable medium according to claim 9, further comprising a management data generation step that generates transmission order data for managing transmission order of print data of each page generated by said print data generation step, wherein, if the printer is a type of device that retains a single sheet on a convoy path for double-sided printing, said management data generation step generates transmission order data in an order of a back side page and a front side page for each sheet, while, if the printer is a type of device that retains two sheets on a convoy path for double-side printing, said management data generation step generates transmission order data in an order of a back side page, a blank page and a front side page from first sheet, and, after the second sheet, generates the transmission order data by replacing the immediately before generated blank page with the back side page, then, adding a blank page and the front side page.

12. The computer-readable medium according to claim 9, wherein said designation step can designate the blank page save in page units, wherein, in a case where the blank page save in page units is selected by said designation step, said print data generation step generates print data of a page of interest if the page of interest is not blank, and does not generate print data of the page if the page of the interest is blank.

* * * * *